US012055206B2

(12) United States Patent
Munoz Sotoca et al.

(10) Patent No.: US 12,055,206 B2
(45) Date of Patent: Aug. 6, 2024

(54) BELT SHEAVE FOR PASSENGER CONVEYOR SYSTEMS

(71) Applicant: Otis Elevator Company, Farmington, CT (US)

(72) Inventors: Javier Munoz Sotoca, Madrid (ES); Marcos Garcia Gonzalez, Madrid (ES)

(73) Assignee: OTIS ELEVATOR COMPANY, Farmington, CT (US)

( * ) Notice: Subject to any disclaimer, the term of this patent is extended or adjusted under 35 U.S.C. 154(b) by 241 days.

(21) Appl. No.: 17/534,033

(22) Filed: Nov. 23, 2021

(65) Prior Publication Data
US 2022/0412402 A1 Dec. 29, 2022

(30) Foreign Application Priority Data
Jun. 28, 2021 (EP) .................................. 21382565

(51) Int. Cl.
| | | |
|---|---|---|
| B66B 15/04 | (2006.01) | |
| F16C 35/067 | (2006.01) | |
| F16H 55/48 | (2006.01) | |
| B66B 11/04 | (2006.01) | |

(52) U.S. Cl.
CPC ............ *F16H 55/48* (2013.01); *B66B 15/04* (2013.01); *B66B 11/0476* (2013.01); *F16C 35/067* (2013.01)

(58) Field of Classification Search
CPC ..... F16H 55/48; B66B 15/04; B66B 11/0476; F16C 35/067
USPC ......................................................... 198/326
See application file for complete search history.

(56) References Cited

U.S. PATENT DOCUMENTS

| | | | |
|---|---|---|---|
| 5,476,423 A | 12/1995 | Meyer | |
| 11,059,699 B2* | 7/2021 | Duvall | .................... F16H 55/50 |
| 2004/0026676 A1* | 2/2004 | Smith | ..................... B66B 15/04 |
| | | | D8/360 |
| 2009/0048392 A1 | 2/2009 | Tsuda et al. | |

FOREIGN PATENT DOCUMENTS

| | | | |
|---|---|---|---|
| DE | 102017115211 A1 * | 1/2019 | |
| EP | 0712708 A1 | 10/2006 | |
| JP | 2006264208 A | 10/2006 | |

OTHER PUBLICATIONS

DE10162936, Beitzel, et al. Jul. 1, 2002 (Year: 2002).*
(Continued)

*Primary Examiner* — Gene O Crawford
*Assistant Examiner* — Lester Rushin, III
(74) *Attorney, Agent, or Firm* — CANTOR COLBURN LLP

(57) ABSTRACT

A sheave (100) for a passenger conveyor system is provided. The sheave (100) comprises a sheave axis (150) about which the sheave (100) rotates; a cylindrical sleeve (105); and a bearing (120a, 120b) centred on and arranged to rotate about the sheave axis (150). The cylindrical sleeve (105) includes an outer surface (110) including a groove (155) arranged to receive a belt; and an inner surface (115) defining a cylindrical cavity (122) centred on the sheave axis (150). The bearing (120a, 120b) includes an outer race (125a), an inner race (130a) and one or more rolling elements (135a) therebetween, wherein the outer race (125a) comprises a protrusion (140) arranged to hold the bearing (120a, 120b) within the cylindrical cavity (122) due to engagement between the protrusion (140) and the inner surface of the cylindrical sleeve (115).

12 Claims, 10 Drawing Sheets

(56) References Cited

OTHER PUBLICATIONS

JP2014234907, Yamamoto, Dec. 15, 2014 (Year: 2014).*
Popular Types of Plastic Injection Molding Gate and Selection Tips, MPI—Mold Plastic Injection, 2020.7.8 (Year: 2020).*
ES2883423t3, Bertho et al., Dec. 7, 2021 (Year: 2021).*
European Search Report for Application No. 21382565.6, Issued Dec. 22, 2021, 7 Pages.

* cited by examiner

BELT SHEAVE FOR PASSENGER CONVEYOR SYSTEMS

FOREIGN PRIORITY

This application claims priority to European Patent Application No. 21382565.6, filed Jun. 28, 2021, and all the benefits accruing therefrom under 35 U.S.C. § 119, the contents of which in its entirety are herein incorporated by reference.

TECHNICAL FIELD

This disclosure relates to a sheave, and associated cylindrical sleeve, for guiding belts in passenger conveyor systems, and to methods of manufacturing thereof.

BACKGROUND ART

Commercial elevator systems may use belt sheaves as part of a driving system to operate an elevator car. Belt-driven escalator systems have also been proposed. In passenger conveyor systems, drive sheaves are used to both drive and guide a belt. Deflector or idler sheaves may be located at various positions in the system (e.g. between the drive sheave and the elevator car, at the elevator car or at a counterweight) and may be used to maintain proper alignment, roping configuration and tension of belts during operation. Belt sheaves may have belt receiving grooves with a convex (i.e. "crowned") profile contour that restricts sideways wandering motion of belts to ensure alignment. Depending on the material of the sheave compared to the outer material of the belt, the belt groove may need to be machined and/or its surface treated in order to achieve a desired level of friction. Typically many belt sheaves are made of steel with the belt groove being roughened during production to fulfil friction requirements for a belt having a polymeric jacket. Manufacturing of belt sheaves, in particular idler sheaves, may be costly and require many processing steps.

SUMMARY OF THE DISCLOSURE

According to a first aspect of the present disclosure, there is provided a sheave for a passenger conveyor system, the sheave comprising: a sheave axis about which the sheave rotates; a cylindrical sleeve comprising: an outer surface comprising a groove arranged to receive a belt; and an inner surface defining a cylindrical cavity centred on the sheave axis; and a bearing centred on and arranged to rotate about the sheave axis, wherein the bearing includes an outer race, an inner race and one or more rolling elements therebetween; wherein the outer race comprises a protrusion arranged to hold the bearing within the cylindrical cavity due to engagement between the protrusion and the inner surface of the cylindrical sleeve.

It will be appreciated that the outer race comprising a protrusion, wherein the protrusion acts to hold the bearing within the cylindrical cavity, means that the outwardly facing protrusion, i.e. facing towards the inner surface of the cylindrical sleeve, is in physical engagement with the cylindrical sleeve. The protrusion retains the bearing within the cylindrical cavity without requiring any further means of attachment (such as adhesive or welding). Depending on the shape of the outer race, the (e.g. at least one) protrusion may be considered to extend outwardly from the outer race and away from the outer race. The outer race may have an outer profile that substantially matches the inner surface of the cylindrical sleeve. In some examples the inner surface of the cylindrical sleeve may not have a regular cylindrical shape, e.g. the inner surface may include undulations, crenulations, ribs, splines, etc. The protrusion engages with the inner surface of the cylindrical sleeve by interrupting its normal shape.

In some examples, the outer race has a cylindrical form and the (e.g. at least one) protrusion extends away from the outer race, e.g. perpendicularly to the sheave axis. The protrusion(s) may therefore look like gear teeth on the outer race of the bearing. For example, the protrusion(s) comprise a longitudinal axis perpendicular to the outer race and the sheave axis. It will be appreciated that the protrusion(s) may have any suitable and/or desired height (e.g. distance over which the protrusion extends away from the surface of the outer race). In some examples, the protrusion(s) have a height between 0.1 mm and 10 mm, e.g. between 0.5 mm and 7.5 mm, e.g. between 0.5 mm and 5 mm, e.g. between 0.5 mm and 4 mm, e.g. between 0.5 mm and 3 mm, e.g. between 1 mm and 5 mm, e.g. between 1 mm and 4 mm, e.g. between 1 mm and 3 mm.

It will be appreciated that the (e.g. at least one) protrusion may engage the inner surface of the cylindrical sleeve, to hold the bearing within the cylindrical cavity, by any suitable and/or desired means. In some examples, the protrusion(s) is arranged to form a press fit (e.g. interference fit, e.g. friction fit) engagement with the inner surface of the cylindrical sleeve.

A press fit engagement may be formed between the protrusion(s) and the inner surface of the cylindrical sleeve by virtue of the outer race of the bearing having a dimension (e.g. diameter) which is equal to or greater than a dimension (e.g. diameter) of the inner surface. For example, the dimension (e.g. diameter) of the outer race may be considered to be the linear measurement passing from a radially outermost point of a protrusion (e.g. the part of the protrusion which is farthest from the sheave axis) to a radially outermost point on the other side of the outer race (e.g. which may also comprise a protrusion at that radial position) and passing through the sheave axis. In some examples, it will be appreciated that the dimension of the outer race is the linear measurement from the radially outermost point of two protrusions and passing through the sheave axis such that the dimension is an effective diameter of the outer race.

It may be appreciated that the protrusion(s) are three-dimensional in shape and thus have a plurality of sides (i.e. surfaces) which may engage with the inner surface of the cylindrical sleeve. In examples of a press fit engagement, the equal or greater diameter of the outer race relative to the inner surface of the cylindrical cavity results in contact pressure at the interface between at least one (e.g. all) side(s) of the protrusion(s) and the inner surface of the cylindrical sleeve such that the contact pressure between the protrusion(s) and the inner surface holds the bearing and cylindrical sleeve together (e.g. via friction). Preferably, the press fit between the protrusion(s) and the inner surface hold the bearing and cylindrical sleeve together such that they are substantially immovable with respect to each other. The protrusion(s) may therefore be arranged to hold the bearing within the cylindrical cavity due to frictional engagement with the inner surface of the cylindrical sleeve.

In some examples, the protrusion(s) form a press fit engagement with the inner surface of the cylindrical sleeve, wherein the inner surface is a substantially regular cylindrical surface (e.g. a cross-section of the inner surface in the plane perpendicular to the sheave axis is substantially a circle or oval). For example, if the protrusion(s) comprise a shape with a (e.g. substantially flattened) top surface, the shape being e.g. a cube, e.g. a cuboid, e.g. a polygon-based prism, e.g. a truncated cone or pyramid, only the (e.g. flattened) top surface may engage the inner surface of the cylindrical sleeve to form the press fit engagement.

In some examples, a press fit engagement between the bearing and the cylindrical sleeve may be formed by applying pressure sufficient to overcome frictional forces (e.g. arising from the difference in the dimensions of the inner surface of the cylindrical sleeve and the outer race) such that the bearing is forced inside the cavity of the (e.g. preformed) cylindrical sleeve. This may apply, for example, to a bearing being pushed into a metal sleeve. In other examples, described in more detail below, the cylindrical sleeve may be made of a polymeric material or a polymer-based composite material and the press fit engagement between the bearing and the cylindrical sleeve may be formed by stress relaxation, during production and/or use.

In some other examples, alternatively or in addition, the engagement between the protrusion(s) and the inner surface may comprise a lock-and-key or other corresponding fit. For example, the inner surface of the cylindrical sleeve may comprise one or more indentation(s) (e.g. recesses) that correspond closely to the negative shape (e.g. imprint) of the protrusion(s). In some examples, the inner surface of the cylindrical sleeve comprises a plurality of indentations. The protrusion(s) may be (e.g. at least partially) received within the indentation(s) to form a lock-and key fit such that the bearing is held within the cylindrical sleeve by the mating interaction between the protrusion(s) and the indentation(s) on the inner surface of the cylindrical sleeve. In these examples the bearing may fit inside the cylindrical sleeve without requiring a force to be applied in the same way as the press fit engagement described above.

In some examples the protrusion(s) and/or the indentation(s) may be annular (e.g. having a shape corresponding to a continuous ring around the circumference of the inner surface of the cylindrical sleeve) or helical, but at least for a lock-and key fit this may not prevent relative rotational movement between the bearing and the cylindrical sleeve. In some examples the protrusion(s) and/or the indentation(s) are arranged discretely around the circumference of the inner surface of the cylindrical sleeve, such that their frictional engagement prevents relative rotational movement between the bearing and the cylindrical sleeve.

More than one type of engagement may be present to hold the bearing within the cylindrical sleeve. In some examples, the press fit engagement between the protrusion(s) and the inner surface also comprises a lock and key fit between the indentation(s) and protrusion(s). For example, the indentation(s) have a size that is substantially the same or smaller than the protrusion(s) such that there is contact pressure between (e.g. at least one side of) the protrusion(s) and (e.g. at least one side of) the indentation(s) such that the bearing is held within the cylindrical cavity via friction as well as a mating interaction.

In some examples, the indentation(s) may have a size that is approximately the same size or larger than the protrusion(s). In such examples, the protrusion(s) may be received within the bearing but the bearing may exhibit a (e.g. partial) rotational movement around the sheave axis with respect to the cylindrical sleeve, wherein said movement is constrained by engagement (e.g. contact) between (e.g. at least one side of) the protrusion(s) and (e.g. at least one side of) the indentation(s). For example, the indentation(s) surround(s) the protrusion(s) and form a physical barrier to the relative radial movement of the protrusion(s). In some examples, an adhesive or other joining material (e.g. layer) may be disposed between a protrusion and a corresponding indentation (e.g. having a slightly larger size) such that the bearing is substantially immovable with respect to the cylindrical sleeve.

In some examples, the indentation(s) are formed when the bearing is inserted into the cylindrical sleeve. For example, the outer race comprising the protrusion(s) has a dimension greater than the dimension of the inner surface such that pressure is required to insert the bearing into the cylindrical cavity. In examples where the cylindrical sleeve is made from a material that is deformable (e.g. malleable) upon the application of pressure, the pressure required to insert the bearing may result in the formation of the indentation(s) on the inner surface of the cylindrical sleeve as the bearing is forced inside the cavity of the cylindrical sleeve.

In some examples, the indentation(s) are formed after the bearing has been inserted into the cylindrical cavity. For example, the dimensions of the outer race comprising the protrusion(s) may be substantially equal to or smaller than the diameter of the inner surface of the cylindrical sleeve such that there is contact pressure between the top surface of the protrusion and the inner surface of the cylindrical sleeve upon insertion of the bearing. Preferably the contact pressure is sufficient to hold the bearing in place but does not form indentation(s) in the inner surface of the cylindrical sleeve. However, when the sheave is in use, some heating of the sheave may arise e.g. due to heat transfer from a motor driving the sheave, such that the cylindrical sleeve becomes (at least partially) malleable and moulds around the protrusion(s) of the outer race to create the indentations during use. Such plastic deformation may occur more readily for a cylindrical sleeve made of a polymeric material or a polymer-based composite material.

In some examples, the indentation(s) may be (e.g. at least partially) formed on the inner surface of the cylindrical sleeve after the bearing has been positioned within the cylindrical sleeve. For example, the inner surface may comprise a dimension (e.g. diameter) that may be varied (e.g. expanded and/or contracted). In such examples, the bearing may be inserted into the cylindrical cavity when the inner surface has a first dimension (e.g. diameter) (e.g. in an expanded state) which is greater than the dimensions of the outer race. After insertion, the inner surface may be varied (e.g. contracted) to give a second diameter (e.g. in a contracted state), wherein the second dimension is smaller than the first dimension.

For example, the cylindrical sleeve may provide an expanded state (with the inner surface having a first dimension), and then cooled to provide a contracted state (with the inner surface having a second dimension, wherein the first dimension is greater than the second dimension). For example, the cylindrical sleeve may be in the expanded state when the material of the cylindrical sleeve is at an elevated temperature (e.g. a temperature above the material's glass transition temperature or approaching its melting point). An elevated temperature may be provided during the manufacture of the cylindrical sleeve or by re-heating the cylindrical sleeve post-production. The contracted state may be obtained upon cooling of the cylindrical sleeve (e.g. to a temperature below the glass transition temperature) such that the cylindrical sleeve transitions from the expanded state to the contracted state. The cylindrical sleeve may thus be heated to provide an expanded state (e.g. with a first dimension) before the bearing is inserted within the cylindrical cavity. After insertion of the bearing the cylindrical sleeve may be allowed to transition (e.g. upon cooling) from the expanded state to a contracted state (e.g. comprising a second dimension that is smaller than the first dimension) such that the inner surface forms (e.g. moulds) itself around the protrusion(s) to form the indentation(s).

In some examples, the cylindrical sleeve may be manufactured (e.g. formed) around the bearing such that the indentations may be simultaneously formed as the cylindrical sleeve is made. In such examples, the indentation(s) are formed as an imprint of the protrusion(s) such that the indentation(s) naturally have the negative shape of the protrusion(s) and a press fit engagement is formed between the protrusion(s) and the inner surface of the cylindrical sleeve during the manufacture of the cylindrical sleeve.

The protrusions(s) may be considered to comprise a first cross-sectional shape in the plane perpendicular to the sheave axis. It will be appreciated that the first cross-sectional shape may be any suitable and/or desirable shape wherein the (e.g. curved) external surface of the outer race forms one side (e.g. the base) of the shape. In some examples, the first cross-sectional shape may be a semicircle, dome, or curved outline. In some examples, the first cross-sectional shape may be substantially a square, a rectangle, a trapezoid, a triangle, a truncated parabola or a truncated hyperbola. For example, if the first cross-sectional shape is substantially a square the protrusion may have three straight sides related to each other by two 90° angles, wherein the fourth side (e.g. formed by the outer race) is curved (e.g. concaved into the protrusion). In some examples, the first cross-sectional shape may further include curved, fileted, rounded or chamfered corners. In some examples, the first cross-sectional shape is a four-sided polygon, e.g. a square or rectangle with four internal angles greater than 90° and two internal angles equal to or less than 90° (e.g. preferably wherein the two angles that are equal to or less than 90° are at the base of the cross-section adjacent to the groove surface), e.g. a trapezoid.

It will be appreciated that the protrusion(s) may be three-dimensional and thus comprise a length parallel to the sheave axis. For example, the first cross-sectional shape may be extended along the outer race surface in a direction parallel to the sheave axis to provide a protrusion having a given length. In some examples, the protrusion(s) has/have a length that is substantially equal to the width of the outer race (e.g. the dimension of the outer race parallel to the sheave axis). For example, the protrusion(s) comprise(s) a longitudinal axis in parallel with the sheave axis and a length that is substantially equal to the width of the outer race. In some examples, the protrusion(s) has/have a length that is less than the width of the outer race.

In some examples, the first cross-sectional shape is constant along the length of the protrusion. For example the three-dimensional shape of the protrusion(s) is a prism, e.g. a polygon-based prism wherein the polygon base comprises the first cross-sectional shape. In some examples, the first cross-sectional shape may vary along the length of the protrusion. For example, the three-dimensional shape of the protrusion may comprise a gradient (e.g. a sloped transition) from the surface of the outer race to the maximum height of the protrusion.

In some examples, the protrusion(s) may comprise a second cross-sectional shape parallel to the length of the protrusion(s) wherein the second cross-sectional shape is any suitable and/or desirable shape. For example, the second cross-sectional shape may be a square, a rectangle, a trapezoid, a triangle, truncated parabola or truncated hyperbola. In some examples, the second cross-sectional shape may further include curved, fileted, rounded or chamfered corners. In some examples, the second cross-sectional shape is a polygonal shape, preferably flattened or rounded at the top (e.g. to create a gradual transition from the surface of the outer race to the top of the protrusion). In some examples, the second cross-sectional shape is a four-sided polygon, e.g. a square or rectangle with four internal angles greater than 90° and two internal angles equal to or less than 90° (e.g. preferably wherein the two angles that are equal to or less than 90° are at the base of the cross-section adjacent to the groove surface), e.g. a trapezoid.

In some examples, the outer race comprises a plurality of protrusions. In some examples, the plurality of protrusions are arranged to provide a cogged surface on the outer race (e.g. a cross-section of the bearing in the plane perpendicular to the sheave axis is a cog wheel shape).

In some examples, each protrusion of the plurality of protrusions is located at a different radial position along the outer race. For example, a plurality of protrusions, each having a width substantially equal to the width of the outer race, may be arranged around the outer race such that each of the protrusions is at a different radial position around the outer race. In some examples, the plurality of protrusions are evenly distributed around the outer race.

In some examples, the plurality of protrusions may be separated by a space between the protrusions, e.g. between a pair of protrusions there is a portion (e.g. space) of the (e.g. curved) outer race surface which does not comprise a protrusion. In some examples, the plurality of protrusions are substantially touching, e.g. the space between protrusions is substantially zero, e.g. the protrusions substantially entirely cover the outer race surface.

The cylindrical sleeve may be considered to be a cylinder comprising a cylindrical bore that extends linearly from one circular face to the other circular face to provide the (e.g. substantially) cylindrical cavity extending therethrough (e.g. defined by the inner surface of the cylindrical sleeve). It will be appreciated that the cylindrical sleeve may have any suitable and/or desirable length (e.g. the distance along the sheave axis that the cylindrical sleeve extends) and/or thickness (e.g. the distance extending perpendicularly from the inner surface to the outer surface).

In some examples, the groove (on the outer surface) comprises a groove surface including a width parallel to the sheave axis. In some examples, the width of the groove is between 20 mm and 100 mm, e.g. between 30 mm and 80 mm, e.g. between 40 mm and 70 mm, e.g. between 45 mm and 65 mm, e.g. between 50 mm and 60 mm, e.g. between 50 mm and 55 mm.

In some examples, a radial distance from the sheave axis to the groove surface varies along the width of the groove such that the groove surface has a crowned surface. It will be appreciated that a crowned surface helps to provide self-centring of the belt when the belt is received within the groove (e.g. during use within an elevator system). In addition, or alternatively, the outer surface of the cylindrical sleeve may comprise rims at either side of the groove.

In some examples, the cylindrical sleeve has a thickness maximum value (e.g. the thickness at the crown of the groove) that is between 5 mm and 50 mm, e.g. between 5 mm and 30 mm, e.g. between 5 mm and 20 mm, e.g. between 5 mm and 10 mm, e.g. about 7-8 mm.

In some examples, the cylindrical sleeve is solidly filled (e.g. with the material of the cylindrical sleeve) between the inner surface and the outer surface. In some examples, the cylindrical sleeve is integrally formed from a unitary piece of material. In some examples the cylindrical sleeve (e.g. on visual inspection) comprises substantially no welding joints (e.g. weld lines, e.g. meld lines).

In some examples, the cylindrical sleeve is substantially made of a metallic material or metal-based composite material. For example, the material that (e.g. solidly) fills the space between the inner and outer surface of the cylindrical sleeve consists of or substantially comprises a metallic material. In some examples, the metallic material is suitable for use in injection moulding processes, such as Metal Injection Moulding (MIM).

In some examples, the cylindrical sleeve is substantially made of a polymeric material. For example, the material that (e.g. solidly) fills the space between the inner and outer surface of the cylindrical sleeve consists of or substantially comprises a polymeric material. In some examples, the polymeric material is suitable for use in injection moulding. For example, the polymeric material consists of or comprises a thermoplastic polymer.

In some examples, the cylindrical sleeve is substantially made of a polymer-based composite material, e.g. comprising a polymeric (e.g. thermoplastic) matrix with fibre or particulate reinforcement dispersed therein. The polymer matrix may comprise a homopolymer, a heteropolymer, a block co-polymer (e.g. di-block polymers, e.g. tri-block polymers), or any suitable and/or desirable blend or mixtures thereof. In some examples the polymers forming the polymer matrix may be natural or synthetic. Preferably the (e.g. blend of) polymer(s) forming the polymer matrix comprise thermoplastic polymer(s) suitable for use in an injection moulding process for the manufacture of the cylindrical sleeve.

In some examples the polymeric matrix comprises a polyamide (e.g. aliphatic polyamide, polyphthalamide and/or aramid) or a polyacrylamide. In some examples, the polymer matrix comprises Nylon 6 and/or Nylon 66. In various examples, the polymer-based composite material comprises a (e.g. thermoplastic) polymer matrix including fibre reinforcement.

In some examples, the polymeric material may be a carbon fibre reinforced polymer. In some examples, the polymeric material is a carbon fibre reinforced polyamide or polyacrylamide. For example, the polymeric material may be carbon fibre reinforced Nylon 6 or carbon fibre reinforced Nylon 66, or combinations and blends thereof.

In some examples, the polymeric material may be a glass fibre reinforced polymer (GFRP). In some examples, the polymeric material is a glass fibre reinforced polyamide or polyacrylamide. For example, the polymeric material may be glass fibre reinforced Nylon 6 or glass fibre reinforced Nylon 66, or combinations and blends thereof. In some examples, the glass fibres comprise or consist of silicon dioxide ($SiO_2$).

In some examples, the (e.g. glass, e.g. carbon) fibre reinforcement comprise long (e.g. glass, e.g. carbon) fibres, e.g. (e.g. glass, e.g. carbon) fibres comprising a length (e.g. an end to end length) of between 3 mm and 5 mm. In some examples, the (e.g. glass, e.g. carbon) fibre reinforcement is predominantly all long (e.g. glass, e.g. carbon) fibres, e.g. more than 80 wt. % of the (e.g. glass, e.g. carbon) fibre reinforcement is long (e.g. glass, e.g. carbon) fibres, e.g. more than 90 wt. % of the (e.g. glass, e.g. carbon) fibre reinforcement is long (e.g. glass, e.g. carbon) fibres, e.g. more than 95 wt. % of the (e.g. glass, e.g. carbon) fibre reinforcement is long (e.g. glass, e.g. carbon) fibres.

In some examples, the polymeric material comprises between 30 wt. % to 80 wt. % (e.g. long) (e.g. glass, e.g. carbon) fibres (e.g. wherein the (e.g. glass, e.g. carbon) fibre is dispersed within the polymer matrix). For example, the polymeric material may comprise between 40 wt. % to 70 wt. % (e.g. long) (e.g. glass, e.g. carbon) fibres, e.g. between 45 wt. % to 65 wt. % (e.g. long) (e.g. glass, e.g. carbon) fibres, e.g. between 50 wt. % to 60 wt. % (e.g. long) (e.g. glass, e.g. carbon) fibres.

In some examples, the polymeric material is selected from the Ultramid® range manufactured by BASF Chemical Company Group (Germany), for example, glass fibre reinforced Ultramid®.

In some examples, the cylindrical sleeve is moulded as a unitary (e.g. single) piece from the polymeric material. For example, the cylindrical sleeve may be manufactured by injecting the polymeric (e.g. thermoplastic) material into a mould. In some examples, the cylindrical sleeve is manufactured via disc gate injection moulding.

According to a second aspect of the present disclosure, there is provided a cylindrical sleeve for a sheave for a passenger conveyor system, the cylindrical sleeve comprising: an outer surface comprising a groove arranged to receive a belt; and an inner surface defining a cylindrical cavity; wherein the cylindrical sleeve is substantially made of a polymeric material or a polymer-based composite material, and wherein the cylindrical sleeve is made by disc gate injection moulding. Disc gate injection moulding has been found to be a particularly beneficial technique for manufacturing a cylindrical sleeve for use as a sheave, i.e. including a groove arranged to receive a belt in a passenger conveyor system. This manufacturing technique is detectable in the cylindrical sleeve e.g. due to the absence of weld lines and/or the resultant fibre orientation, as will be described in more detail below.

It will be appreciated that, the cylindrical sleeve of the second aspect may incorporate any or all of the features of the examples of the cylindrical sleeve described above with respect to the first aspect. In some examples, the cylindrical sleeve of the second aspect is the cylindrical sleeve of the sheave as defined by the first aspect of the disclosure.

The inventors have surprisingly found that manufacturing the cylindrical sleeve via disc gate injection moulding provides a cylindrical sleeve that is substantially free of weld lines and thus has an improved tensile strength (e.g. load-carrying capacity) and increased values of stress and strain at failure. Furthermore, the inventors have found that injection moulding a long (e.g. glass, e.g. carbon) fibre reinforced polymer using a disc gate mould injection process results in improved (e.g. glass, e.g. carbon) fibre orientation in a direction substantially parallel to the inner and outer surfaces of the cylindrical sleeve. The improved orientation has been found to further improve the tensile strength of the cylindrical sleeve, e.g. when compared to a component comprising randomly oriented (e.g. glass, e.g. carbon) fibres dispersed within a polymer matrix.

In particular, the inventors have surprisingly found that manufacturing the cylindrical sleeve by injection moulding through a disc gate provides a material structure that comprises a higher weight percent of the polymer matrix (and a lower weight percentage of (e.g. glass, e.g. carbon) fibre) present at the outer surface of the cylindrical sleeve. As such, disc gate moulding helps to provide a cylindrical sleeve with a smooth outer surface (e.g. low roughness) whilst reducing the requirement for additional machining, such as polishing or sanding. Providing a smooth surface is important because it helps to reduce damage to belts when the belts come into contact with the groove surface. Furthermore, the inventors have surprisingly found that the surface layers help to minimise the generation of electrostatic charges on the surface of the belt and/or sheave which may contribute to degradation or wear of the belt when present. This contrasts to sheaves made of steel which often require multiple post-production steps (e.g. machining steps such as polishing, e.g. coating steps to provide additional layers of material on the surfaces) in order to provide a surface which is suitable (e.g. sufficiently smooth with minimised charge generation) for use as a sheave for engagement with a belt in an elevator system.

In some examples, the cylindrical sleeve comprises a core made of a polymer with a first weight percentage of (e.g. glass, e.g. carbon) fibre reinforcement and (e.g. two) surface layers, defining the outer surface and the inner surface of the cylindrical sleeve, made of a polymer with a second, lower, weight percentage of (e.g. glass, e.g. carbon) fibre reinforcement.

In some examples the core comprises substantially all of the (e.g. glass, e.g. carbon) fibres present within the cylindrical sleeve, e.g. the core comprises substantially all of the between 30 wt. % to 80 wt. % (e.g. long) (e.g. glass, e.g. carbon) fibres dispersed within the polymeric material of the entire cylindrical sleeve. For example, the core may comprise between 40 wt. % to 70 wt. % (e.g. long) (e.g. glass, e.g. carbon) fibres, e.g. between 45 wt. % to 65 wt. % (e.g. long) (e.g. glass, e.g. carbon) fibres, e.g. between 50 wt. % to 60 wt. % (e.g. long) (e.g. glass, e.g. carbon) fibres dispersed within the polymeric material of the entire cylindrical sleeve. In some examples, the core comprises between 35 wt. % to 85 wt. % (e.g. long) (e.g. glass, e.g. carbon) fibres dispersed within the core polymeric matrix. For example, the core may comprise between 45 wt. % to 75 wt. % (e.g. long) (e.g. glass, e.g. carbon) fibres, e.g. between 50 wt. % to 70 wt. % (e.g. long) (e.g. glass, e.g. carbon) fibres, e.g. between 55 wt. % to 65 wt. % (e.g. long) (e.g. glass, e.g. carbon) fibres dispersed within the polymeric matrix of the core.

In some examples, the (e.g. two) surface layers comprise less than 10 wt. % (e.g. glass, e.g. carbon) fibre reinforcement, e.g. less than 5 wt. % (e.g. glass, e.g. carbon) fibre reinforcement, e.g. less than 4 wt. % (e.g. glass, e.g. carbon) fibre reinforcement, e.g. less than 3 wt. % (e.g. glass, e.g. carbon) fibre reinforcement, e.g. less than 2 wt. % (e.g. glass, e.g. carbon) fibre reinforcement, e.g. less than 1 wt. % (e.g. glass, e.g. carbon) fibre reinforcement, e.g. less than 0.5 wt. % (e.g. glass, e.g. carbon) fibre reinforcement.

In some examples, each surface layer has a thickness of less than 25% the maximum thickness of the sheave, e.g. less than 20%, e.g. less than 15%, e.g. less than 10%, e.g. less than 5% the maximum thickness of the sheave. In some examples, each surface layer has a thickness of greater than 0.5% the maximum thickness of the sheave, e.g. greater than 1%, e.g. greater than 2%, e.g. greater than 3%, e.g. greater than 4%, e.g. greater than 5%, e.g. greater than 6%, e.g. greater than 7%, e.g. greater than 8%, e.g. greater than 9%, e.g. greater than 10% the maximum thickness of the sheave.

In some examples, each surface layer has a thickness of less than 3 mm, e.g. less than 2.5 mm, e.g. less than 2 mm, e.g. less than 1.5 mm, e.g. less than 1 mm, e.g. less than 0.9 mm, e.g. less than 0.8 mm, e.g. less than 0.1 mm, e.g. less than 0.6 mm, e.g. less than 0.5 mm, e.g. less than 0.4 mm, e.g. less than 0.3 mm, e.g. less than 0.2 mm, e.g. less than 0.1 mm. In some examples, each surface layer has a thickness of greater than 0.01 mm, e.g. greater than 0.05 mm, e.g. greater than 0.1 mm, e.g. greater than 0.15 mm, e.g. greater than 0.2 mm, e.g. greater than 0.3 mm, e.g. greater than 0.4 mm, e.g. greater than 0.5 mm, e.g. greater than 0.6 mm, e.g. greater than 0.7 mm, e.g. greater than 0.8 mm, e.g. greater than 0.9 mm, e.g. greater than 1 mm.

In some examples, the core further comprises an outer portion, an inner portion and a central portion sandwiched between the outer and inner portions. The outer and inner portions include (e.g. glass, e.g. carbon) fibres that are predominantly aligned in parallel with the outer and inner surfaces of the cylindrical sleeve respectively. The central portion, sandwiched therebetween, includes (e.g. glass, e.g. carbon) fibres that are predominantly randomly orientated. In such examples, alignment of the (e.g. glass, e.g. carbon) fibres in parallel with the inner and outer surface helps to improve the mechanical properties, such as the tensile strength, of the cylindrical sleeve such that the sheave is able to withstand the high loads required for use within elevator systems whilst improving resistance to stress fractures or breakage.

For example, the cylindrical sleeve or its core comprises an outer portion wherein the (e.g. glass, e.g. carbon) fibre reinforcement is predominantly aligned with the outer surface, a central portion radially inward of the outer portion wherein the (e.g. glass, e.g. carbon) fibre reinforcement is predominantly arranged randomly, and an inner portion radially inward of the central portion wherein the (e.g. glass, e.g. carbon) fibre reinforcement is predominantly aligned with the inner surface.

In some examples, the surface layers are positioned to be radially outward of the outer portion and inner portion such that the surface layers form the outer surface and inner surface of the cylindrical sleeve.

In some examples, the cylindrical sleeve further comprises at least one annular rib extending from the inner surface towards the sheave axis. The annular rib(s) may divide the inner surface of the cylindrical sleeve into a first and second (e.g. axially spaced apart) portions. The annular rib may be formed as an artefact of a disc gate injection moulding process but then exploited to separate a pair of bearings held side-by-side within the cylindrical cavity.

In some examples, the sheave may comprise a first bearing held within the cylindrical cavity of the first portion and a second bearing held within the cylindrical cavity of the second portion.

In some examples, the annular rib has a width parallel to the sheave axis, wherein the width may be between 0.5 mm and 10 mm, e.g. between 1 mm and 8 mm, e.g. between 2 mm and 6 mm, e.g. between 2 mm and 5 mm, e.g. between 2 mm and 4 mm, e.g. approximately 3 mm.

The rolling elements, between the inner race and the outer race of the bearing, may be arranged such that the rolling elements form an annular row within the sheave. In some examples, the rolling elements are selected to be one of ball bearing, cylindrical rollers, spherical rollers, tapered rollers, or needle rollers. In some examples, the rolling elements are ball bearings arranged between the inner race and the outer race of the bearing such that the ball bearings form an annular row within the sheave. In some examples, the annular row is centred on the sheave axis such that rotation of the ball bearing, and corresponding rotation of the sheave, is centred on the sheave axis.

In some examples, the sheave comprises two (or more) annular rows of ball bearing. For example, the sheave may comprise two bearings (e.g. each comprising an inner race, an outer race, and an annular row of ball bearings disposed therebetween), wherein the two bearings (and thus annular rows of ball bearings) are arranged in parallel, centred on the sheave axis.

In some examples, the two (or more) bearings are engaged with different (e.g. axially spaced apart) portions of the inner surface of the cylindrical sleeve. For example, in examples comprising two (or more) annular rows within a single bearing, the two (or more) annular rows may be respectively seated on axial left (distal) and right (proximate) sides of radial inner ball seating grooves. For example, in examples comprising two (or more) annular rows in two (or more) bearings, the bearings may be respectively seated on axial left (distal) and right (proximate) sides of the (e.g. radial) annular rib on the inner surface.

The present disclosure also extends to a sheave system comprising a plurality of the sheaves (according to any of the aspects described herein and any or all of the examples thereof) arranged side by side along the sheave axis.

According to a third aspect of the present disclosure, there is provided a method of manufacturing a sheave for a passenger conveyor system, the method comprising: preparing a polymeric material or a polymer-based composite material for injection moulding; injecting the polymeric material or a polymer-based composite material into a mould (e.g. via a disc gate), wherein the mould is arranged to produce a cylindrical sleeve comprising the polymeric material or polymer-based composite material, the cylindrical sleeve comprising: an outer surface comprising a groove arranged to receive a belt; and an inner surface defining a cylindrical cavity centred on the sheave axis; removing at least part of the mould to expose the inner surface of the cylindrical sleeve; and inserting a bearing into the cylindrical cavity while the cylindrical sleeve is at an elevated temperature, wherein the bearing includes an outer race, an inner race and one or more rolling elements therebetween, such that subsequent cooling of the cylindrical sleeve creates an engagement between an outer surface of the outer race and the inner surface of the cylindrical sleeve.

It will be appreciated that, in some examples, the method of the third aspect may be used to manufacture the sheave according to any or all of the examples described above for the first aspect of the disclosure in relation to a cylindrical sleeve comprising a polymeric material or a polymer-based composite material. However, it will be appreciated that the method of the third aspect is not limited to providing a sheave in accordance with the first aspect of the disclosure (i.e. one in which the bearing includes protrusions) and thus the method of the third aspect may be used to manufacture a sheave that does not fall within the scope of the first aspect of the disclosure.

It has been recognised that contraction of the polymeric material upon cooling can create the engagement between an outer surface of the outer race and the inner surface of the cylindrical sleeve. In the absence of the outer race comprising any protrusions, the shrinkage of the cylindrical sleeve may result in a press fit engagement between the outer race of the bearing and the inner surface. This means that the bearing is held within the cylindrical cavity once the manufacturing method is complete.

Examples according to this third aspect of the disclosure may use any suitable method of injecting the polymeric material or a polymer-based composite material into a mould, whether a conventional injection moulding technique or a disc gate injection moulding process as already described above.

In some examples, the step of preparing the polymeric material or a polymer-based composite material for injection comprises heating the material to a temperature above the material's melting temperature such that the material is in a (e.g. liquid) state for injection. It will be appreciated that, when the material is a polymeric material, the melting temperature is the temperature at which the polymeric material melts (e.g. transitions from a solid state to a liquid state) and may be injected into the mould, e.g. via a disc injection gate.

Similarly, in examples wherein the material is a polymer-based composite material comprising (e.g. glass, e.g. carbon) fibres, the melting temperature to which the material is heated is to a temperature above the melting temperature of the polymer-based matrix material (e.g. the polymer into which the (e.g. glass, e.g. carbon) fibres are dispersed) but below the melting temperature of the (e.g. glass, e.g. carbon) fibres dispersed therein such that the glass fibres remain in (e.g. solid) fibre form before, during and after the injection steps. Thus, the polymer-based composite material is the temperature at which the polymer matrix melts (e.g. transitions from a solid state to a liquid state) such that the polymer matrix with the (e.g. glass, e.g. carbon) fibres dispersed therein may be injected into the mould, e.g. via a disc injection gate.

In some examples, the preparing step comprises heating the polymeric material or polymer-based composite material to a temperature above 120° C., e.g. above 150° C., e.g. above 180° C., e.g. above 200° C., e.g. above 240° C., e.g. between 240° C. and 350° C.

In some examples, the preparing step further comprises combining a (e.g. glass, e.g. carbon) fibre material with a polymer-based material to provide a polymer-based composite material. In some examples, the step of combining (e.g. mixing, e.g. dispersing) the (e.g. glass, e.g. carbon) fibre with the polymer-based material occurs before the polymer-based material (that forms the polymer matrix) is heated to a temperature above the polymer-based material's melting temperature. For example, the (e.g. glass, e.g. carbon) fibre and the polymer-based material are combined when the polymer-based material is substantially a solid (e.g. in granular form or the like).

In some examples, the step of combining (e.g. mixing, e.g. dispersing) the (e.g. glass, e.g. carbon) fibre with the polymer matrix occurs after the polymer-based material (that forms the polymer matrix) has been heated to a temperature above the polymer-based material's melting temperature. For example, the (e.g. glass, e.g. carbon) fibre and the polymer-based material are combined when the polymer-based material is substantially a liquid.

In some examples, the step of combining (e.g. mixing, e.g. dispersing) the (e.g. glass, e.g. carbon) fibre within the matrix occurs as the polymer-based material (that forms the polymer matrix) is being heated to a temperature above the polymer-based material's melting temperature. For example, the (e.g. glass, e.g. carbon) fibre and the polymer-based material are combined when the polymer-based material is transitioning from a solid to a liquid state.

In some examples, the inner surface of the cylindrical sleeve comprises a first dimension (e.g. diameter). For example, the cylindrical cavity may have a first diameter when the cylindrical sleeve is in an expanded state. The expanded state may be provided when the cylindrical sleeve (e.g. the material making the cylindrical sleeve) is at an elevated temperature during the injection moulding step. Following injection moulding of a polymeric material or a polymer-based composite material, the elevated temperature may be a temperature above the material's glass transition temperature ($T_g$), e.g. above 45° C., e.g. above 50° C., e.g. above 70° C., e.g. above 100° C.).

In some examples, the bearing is inserted into the cylindrical cavity when the cylindrical cavity comprises the first dimension (e.g. the cylindrical cavity is provided in an expanded state). For example, the bearing may be inserted into the cylindrical cavity (with or without the application of pressure) when the material of the cylindrical sleeve is at any elevated temperature (e.g. above the material's glass transition temperature), e.g. above 45° C., e.g. above 50° C., e.g. above 70° C., e.g. above 100° C., with subsequent cooling of the cylindrical sleeve to ambient temperature then creating an engagement between an outer surface of the outer race and the inner surface of the cylindrical sleeve. The subsequent cooling of the cylindrical sleeve to ambient temperature may result in the cylindrical cavity comprising a second dimension that is less than the first dimension (e.g. the cylindrical cavity cools to a contracted state). Thus the cylindrical cavity contracts around the bearing to create the engagement therebetween.

The subsequent cooling may take place naturally. In some examples, the method further comprises a step of cooling the cylindrical sleeve, after the bearing has been inserted, to a cooled temperature (e.g. below the material's glass transition temperature) e.g. below 50° C., e.g. below 30° C., e.g. to substantially room temperature.

In some examples, the second diameter of the cylindrical cavity is between 40 mm and 100 mm, e.g. between 45 mm and 95 mm, e.g. between 50 mm and 90 mm, e.g. between 50 mm and 80 mm, e.g. between 55 mm and 75 mm, e.g. between 60 mm and 70 mm.

In some examples, the contraction of the polymeric material of the cylindrical sleeve results in a press fit engagement between the outer race of the bearing and the inner surface such that the bearing is held within the cylindrical cavity via friction. This can be achieved without the outer race of the bearing comprising any protrusions.

In some examples, the outer race of the bearing is substantially plain (e.g. comprising a flat curved surface) such that the (e.g. press fit) engagement is formed between the (e.g. plain) outer race and the inner surface of the polymeric cylindrical sleeve by virtue of the outer race of the bearing having a diameter which is greater than or equal to a dimension (e.g. diameter) of the inner surface, with reference to the (second) diameter of the inner surface following cooling, i.e. the contracted state of the cylindrical sleeve described above. Within the meaning of the present disclosure, the dimension (e.g. diameter) of the outer race may be considered to be the linear measurement from one side of the outer race external surface to the other, passing through the sheave axis.

In other examples, the bearing may comprise protrusion(s) (e.g. as described above with respect to the first aspect), such that the protrusion(s) hold the bearing within the cylindrical cavity due to engagement between the protrusion(s) and the inner surface of the cylindrical sleeve. For example, the protrusion(s) comprise a longitudinal axis perpendicular to the outer race and the sheave axis. It will be appreciated that the protrusion(s) may have any suitable and/or desired height (e.g. distance over which the protrusion extends away from the surface of the outer race). The protrusion(s) may have a height between 0.1 mm and 10 mm, e.g. between 0.5 mm and 5 mm, e.g. between 1 mm and 4 mm. It will be appreciated that the protrusions may have any suitable and/or desirable shape as described above with reference to the first aspect of the disclosure.

Regardless of whether the outer race comprises protrusions or is plain, the equal or greater (e.g. effective) diameter of the outer race relative to the inner surface of the cylindrical cavity results in contact pressure at the interface between the outer race (e.g. plain outer race, e.g. protrusions) and the inner surface of the cylindrical sleeve in the contracted state, such that the contact pressure holds the bearing and cylindrical sleeve together (e.g. via friction) and they are substantially immovable with respect to each other. The bearing is thus held within the cylindrical cavity due to frictional engagement between the outer race (e.g. plain or comprising protrusion(s)) and the inner surface of the cylindrical sleeve.

The inner surface of the cylindrical sleeve in the contracted state may be moulded around the outer race (e.g. plain, e.g. comprising protrusions) of the bearing such that the shape of the inner surface of corresponds to the shape of the outer race. For example, if the second diameter of the cylindrical sleeve in the contracted state is smaller than the diameter of the (e.g. plain) outer race, it may be appreciated that, in the contracted state the inner surface may comprise an annular indentation (corresponding to the shape of the plain or flat outer race) into which the outer race engages. In such examples, the bearing is held by the press fit engagement between the outer race and the annular indentation on the inner surface of the cylindrical sleeve.

Preferably, the outer race comprises a (plurality of) indentation(s), preferably wherein each indentation is non-annular in shape (e.g. the indentation(s) do not extend annularly around the sheave axis along the circumference of the inner surface). In such examples, if the second diameter of the cylindrical sleeve in the contracted state is smaller than the effective diameter of the outer race comprising protrusion (s), the contraction of the cylindrical sleeve forms a (plurality of) indentation(s) (e.g. corresponding to the shape of a protrusion(s) on the surface of the outer race as described above) on the inner surface of the cylindrical sleeve as the inner surface contracts and moulds itself around the outer race comprising protrusions. The engagement between the protrusion(s) and the indentation(s) may thus comprise both a lock and key fit and a pressure fit.

In such examples, the bearing is held by the press fit engagement between the (e.g. at least one side of the) protrusion(s) of the outer race and the (e.g. at least one side of the) indentation(s) on the inner surface of the cylindrical sleeve, as well as being constrained from radial movement (e.g. around the sheave axis) due to engagement between the protrusion(s) and the indentation(s).

In some examples, the method comprises inserting a bearing while the cylindrical sleeve is still at an elevated temperature resulting from the injecting step. It will be appreciated that this elevated temperature may be lower than the injection temperature. The cylindrical sleeve may be allowed to at least partially cool before or during removal from the mould, i.e. before inserting the bearing.

However, in some other examples the cylindrical sleeve is allowed to completely cool following removal from the mould. In some examples, the method further comprises cooling the cylindrical sleeve, e.g. to temperature below the material's glass transition temperature, e.g. below 30° C., before the bearing is inserted into the cylindrical cavity. The bearing may then be inserted in a later manufacturing step that involves re-heating to an elevated temperature. In such examples of the third aspect, the method further comprises a secondary heating step (e.g. re-heating) wherein the cylindrical sleeve (e.g. after it has been allowed to cool following injection moulding) is heated to an elevated temperature, e.g. a temperature above 30° C., e.g. a temperature above 50° C., e.g. a temperature above 100° C. The elevated temperature at which the bearing is inserted into the cylindrical cavity can be any temperature that enables subsequent cooling to create an engagement with the bearing.

In examples according to this third aspect of the disclosure, the material is substantially a polymeric material suitable for use in injection moulding, e.g. a thermoplastic polymer. In some examples, the material is a polymer-based composite material, for example a polymeric (e.g. thermoplastic) matrix with fibre reinforcement dispersed therein. The polymer matrix may comprise a homopolymer, a heteropolymer, a block co-polymer (e.g. di-block polymers, e.g tri-block polymers), or any suitable and/or desirable blend or mixtures thereof. In some examples the polymers forming the polymer matrix may be natural or synthetic. Preferably the (e.g. blend of) polymer(s) forming the polymer matrix comprise thermoplastic polymer(s) suitable for use in an injection moulding process for the manufacture of the cylindrical sleeve.

In some examples the polymeric matrix comprises a polyamide (e.g. aliphatic polyamide, polyphthalamide and/or aramid) or a polyacrylamide. In some examples, the polymeric matrix comprises Nylon 6 and/or Nylon 66.

In some examples, the polymer-based composite material comprises a (e.g. thermoplastic) polymer matrix including (e.g. glass, e.g. carbon) fibre reinforcement. In some examples, the polymeric material may be a carbon fibre reinforced polymer. In some examples, the polymeric material is a carbon fibre reinforced polyamide or polyacrylamide. For example, the polymeric material may be carbon fibre reinforced Nylon 6 or glass fibre reinforced Nylon 66, or combinations and blends thereof.

In some examples, the polymeric material may be a glass fibre reinforced polymer (GFRP). In some examples, the polymeric material is a glass fibre reinforced polyamide or polyacrylamide. For example, the polymeric material may be glass fibre reinforced Nylon 6 or glass fibre reinforced Nylon 66, or combinations and blends thereof. In some examples, the glass fibres comprise or consist of silicon dioxide ($SiO_2$).

The inventors have recognised that disc gate injection moulding may be well-suited to moulding a polymer-based composite sheave containing long fibre reinforcement and/or a relatively high proportion of fibre reinforcement. Thus, in some examples, the injecting step comprises injecting the polymeric material or a polymer-based composite material into the mould via a disc gate.

In some examples, the (e.g. glass, e.g. carbon) fibre reinforcement comprises long (e.g. glass, e.g. carbon) fibres, e.g. (e.g glass, e.g. carbon) fibres comprising a length (e.g. an end to end length) of between 3 mm and 5 mm. In some examples, the (e.g. glass, e.g. carbon) fibre reinforcement is predominantly all long (e.g. glass, e.g. carbon) fibres, e.g. more than 80 wt. % of the (e.g. glass, e.g. carbon) fibre reinforcement is long (e.g. glass, e.g. carbon) fibres, e.g. more than 90 wt. % of the (e.g. glass, e.g. carbon) fibre reinforcement is long (e.g. glass, e.g. carbon) fibres, e.g. more than 95 wt. % of the (e.g. glass, e.g. carbon) fibre reinforcement is long (e.g. glass, e.g. carbon) fibres.

In some examples, the polymeric material comprises between 30 wt. % to 80 wt. % (e.g. long) (e.g. glass, e.g. carbon) fibres (e.g. wherein the (e.g. glass, e.g. carbon) fibre is dispersed within the polymer matrix). For example, the polymeric material may comprise between 40 wt. % to 70 wt. % (e.g. long) (e.g. glass, e.g. carbon) fibres, e.g. between 45 wt. % to 65 wt. % (e.g. long) (e.g. glass, e.g. carbon) fibres, e.g. between 50 wt. % to 60 wt. % (e.g. long) (e.g. glass, e.g. carbon) fibres.

In some examples, the polymeric material is selected from the Ultramid® range manufactured by BASF Chemical Company Group (Germany), for example, glass fibre reinforced Ultramid®.

In some examples, the injecting step produces a cylindrical sleeve (e.g. formed via disc gate injection moulding) comprising a core made of a polymer reinforced with a first weight percentage of (e.g. glass, e.g. carbon) fibres and (e.g. two) surface layers, defining the outer surface and the inner surface, made of a polymer reinforced with a second, lower, weight percentage of (e.g. glass, e.g. carbon) fibres. One or more parameters of the injection moulding process may be varied so as to produce a cylindrical sleeve according to the examples below.

In some examples, the core comprises substantially all of the (e.g. glass, e.g. carbon) fibres present within the cylindrical sleeve, e.g. the core comprises substantially all of the between 30 wt. % to 80 wt. % (e.g. long) (e.g. glass, e.g. carbon) fibres dispersed within the polymeric material of the entire cylindrical sleeve. For example, the core may comprise between 40 wt. % to 70 wt. % (e.g. long) (e.g. glass, e.g. carbon) fibres, e.g. between 45 wt. % to 65 wt. % (e.g. long) (e.g. glass, e.g. carbon) fibres, e.g. between 50 wt. % to 60 wt. % (e.g. long) (e.g. glass, e.g. carbon) fibres dispersed within the polymeric material of the entire cylindrical sleeve. In some examples, the core comprises between 35 wt. % to 85 wt. % (e.g. long) (e.g. glass, e.g. carbon) fibres dispersed within the core polymeric matrix. For example, the core may comprise between 45 wt. % to 75 wt. % (e.g. long) (e.g. glass, e.g. carbon) fibres, e.g. between 50 wt. % to 70 wt. % (e.g. long) (e.g. glass, e.g. carbon) fibres, e.g. between 55 wt. % to 65 wt. % (e.g. long) (e.g. glass, e.g. carbon) fibres dispersed within the core polymeric matrix.

In some examples, the (e.g. two) surface layers comprise less than 10 wt. % (e.g. glass, e.g. carbon) fibres, e.g. less than 5 wt. % (e.g. glass, e.g. carbon) fibres, e.g. less than 4 wt. % (e.g. glass, e.g. carbon) fibres, e.g. less than 3 wt. % (e.g. glass, e.g. carbon) fibres, e.g. less than 2 wt. % (e.g. glass, e.g. carbon) fibres, e.g. less than 1 wt. % (e.g. glass, e.g. carbon) fibres, e.g. less than 0.5 wt. % (e.g. glass, e.g. carbon) fibres.

In some examples, each surface layer has a thickness of less than 25% the maximum thickness of the sheave, e.g. less than 20%, e.g. less than 15%, e.g. less than 10%, e.g. less than 5% the maximum thickness of the sheave. In some examples, each surface layer has a thickness of greater than 0.5% the maximum thickness of the sheave, e.g. greater than 1%, e.g. greater than 2%, e.g. greater than 3%, e.g. greater than 4%, e.g. greater than 5%, e.g. greater than 6%, e.g. greater than 7%, e.g. greater than 8%, e.g. greater than 9%, e.g. greater than 10% the maximum thickness of the sheave.

In some examples, each surface layer has a thickness of less than 3 mm, e.g. less than 2.5 mm, e.g. less than 2 mm, e.g. less than 1.5 mm, e.g. less than 1 mm, e.g. less than 0.9 mm, e.g. less than 0.8 mm, e.g. less than 0.1 mm, e.g. less than 0.6 mm, e.g. less than 0.5 mm, e.g. less than 0.4 mm, e.g. less than 0.3 mm, e.g. less than 0.2 mm, e.g. less than 0.1 mm. In some examples, each surface layer has a thickness of greater than 0.01 mm, e.g. greater than 0.05 mm, e.g. greater than 0.1 mm, e.g. greater than 0.15 mm, e.g. greater than 0.2 mm, e.g. greater than 0.3 mm, e.g. greater than 0.4 mm, e.g. greater than 0.5 mm, e.g. greater than 0.6 mm, e.g. greater than 0.7 mm, e.g. greater than 0.8 mm, e.g. greater than 0.9 mm, e.g. greater than 1 mm.

In some examples, the core further comprises an outer portion, an inner portion and a central portion sandwiched between the outer and inner portions. The outer and inner portions include (e.g. glass, e.g. carbon) fibres that are predominantly aligned in parallel with the outer and inner surfaces of the cylindrical sleeve respectively. The central portion, sandwiched therebetween, includes (e.g. glass, e.g. carbon) fibres that are predominantly randomly orientated. In such examples, alignment of the (e.g. glass, e.g. carbon) fibres in parallel with the inner and outer surface helps to improve the mechanical properties, such as the tensile strength, of the cylindrical sleeve such that the sheave is able to withstand the high loads required for use within elevator systems whilst improving resistance to stress fractures or breakage.

For example, the injecting step produces a cylindrical sleeve comprising an outer portion wherein the (e.g. glass, e.g. carbon) fibres are predominantly aligned with the outer surface, a central portion radially inward of the outer portion wherein the (e.g. glass, e.g. carbon) fibres are predominantly arranged randomly, and an inner portion radially inward of the central portion wherein the (e.g. glass, e.g. carbon) fibres are predominantly aligned with the inner surface.

In some examples, the surface layers are positioned to be radially outward of the outer portion and inner portion such that the surface layers form the outer surface and inner surface of the cylindrical sleeve.

The manufacturing methods described above are suited to injection moulding of a cylindrical sleeve comprising polymeric material or polymer-based composite material, with the shrinkage that takes place upon cooling being exploited to create an engagement with the bearing. However, the inventors have realised that a bearing may be inserted into the cylindrical cavity when the material is hot or cold, with one or more protrusions at the outer race providing an engagement with the inner surface of the cylindrical sleeve. Thus a further aspect of the present disclosure relates to manufacturing a sheave wherein the cylindrical sleeve is made of any polymeric, metallic or composite material.

a. According to a fourth aspect of the present disclosure, there is provided a method of manufacturing a sheave for a passenger conveyor system, the method comprising: introducing a material into a mould, wherein the mould is arranged to produce a cylindrical sleeve, the cylindrical sleeve comprising: an outer surface comprising a groove arranged to receive a belt; and an inner surface defining a cylindrical cavity centred on the sheave axis; removing at least part of the mould to expose the inner surface of the cylindrical sleeve; and inserting a bearing into the cylindrical cavity to form a sheave, wherein the bearing includes an outer race, an inner race and one or more rolling elements therebetween; wherein the outer race comprises a protrusion arranged to hold the bearing within the cylindrical cavity due to engagement between the protrusion and the inner surface of the cylindrical sleeve.

It will be appreciated that, in some examples, the method of the fourth aspect may be used to manufacture the sheave according to any or all of the examples described above for the first aspect of the disclosure.

In some examples, the method comprises inserting the bearing into the cylindrical cavity while the cylindrical sleeve is at an elevated temperature. As described above in relation to the third aspect, the elevated temperature may be a result of the moulding step (with the possibility of partial cooling taking place after the moulding step and before inserting the bearing) or the cylindrical sleeve may be heated to the elevated temperature in a separate step (e.g. a reheating step).

In some examples, the method further comprises cooling the cylindrical sleeve (e.g. to ambient temperature, e.g. below the material's glass transition temperature) prior to the step of inserting the bearing. In some examples, the cylindrical sleeve is allowed to cool following the moulding step (e.g. to ambient temperature, e.g. below the material's glass transition temperature) prior to the step of inserting the bearing.

In various examples, the bearing is inserted when the cylindrical sleeve is not at an elevated temperature. In such examples, the method further comprises inserting the bearing into the cylindrical cavity of the (e.g. cooled, e.g. room temperature) cylindrical sleeve, by applying pressure to the bearing to form a press fit engagement between the protrusion(s) of the bearing and the inner surface of the cylindrical sleeve, wherein the pressure is sufficient to overcome frictional forces (e.g. arising from the difference in the dimensions of the two (e.g. pre-formed) components) such that the bearing is forced inside the cavity of the cylindrical sleeve.

A press fit engagement may be formed between the protrusion(s) and the inner surface of the cylindrical sleeve by virtue of the outer race of the bearing having a dimension (e.g. diameter) which is equal to or greater than a dimension (e.g. diameter) of the inner surface. In some examples, the inner surface is substantially a smooth cylindrical surface (e.g. a cross-section of the inner surface in the plane perpendicular to the sheave axis is substantially a circle or oval).

It may be appreciated that the protrusion(s) are three-dimensional in shape and thus have a plurality of sides (i.e. surfaces) which may engage with the inner surface of the cylindrical sleeve.

In such examples, the equal or greater diameter of the outer race relative to the inner surface of the cylindrical cavity results in contact pressure at the interface between at least one (e.g. all) side(s) of the protrusion(s) and the inner surface of the cylindrical sleeve such that the contact pressure holds the two parts together (e.g. via friction) and they are substantially immovable with respect to each other. The protrusion(s) may therefore be arranged to hold the bearing within the cylindrical cavity due to frictional engagement with the inner surface of the cylindrical sleeve.

In some examples, the method may further comprise forming indentations on the inner surface of the cylindrical sleeve, wherein the indentations correspond closely to the negative shape (e.g. imprint) of the protrusion(s).

In some examples, the indentation(s) may be formed prior to insertion of the bearing. For example, the indentation(s) may be machined or milled into the inner surface. In some examples, the indentation(s) are formed when the bearing is inserted into the cylindrical sleeve. For example, when the outer race comprising the protrusion(s) has an effective diameter greater than the dimension of the inner surface, the pressure required to insert the bearing may form the indentation(s) on the inner surface of the cylindrical sleeve as the bearing is forced inside the cavity of the cylindrical sleeve. In some examples, the indentation(s) are formed after the bearing is inserted into the cylindrical sleeve. For example, the indentation(s) may be formed during the manufacture of the cylindrical sleeve.

In some examples, the inner surface of the cylindrical sleeve comprises a first dimension (e.g. diameter). For example, the cylindrical cavity may have a first diameter when the cylindrical sleeve is in an expanded state. The expanded state may be provided when the cylindrical sleeve (e.g. the material making the cylindrical sleeve) is at an elevated temperature (e.g. at a temperature above the material's glass transition temperature ($T_g$), e.g. above 45° C., e.g. above 50° C., e.g. above 70° C., e.g. above 100° C.).

In some examples, the bearing is inserted into the cylindrical cavity when the cylindrical cavity comprises a first dimension (e.g. the cylindrical cavity is provided in an expanded state). For example, the bearing may be inserted into the cylindrical cavity (e.g. with or without the application of pressure) when the material of the cylindrical sleeve is at an elevated temperature. When injection moulding a polymeric material or a polymer-based composite material, the elevated temperature may be a temperature above the material's glass transition temperature ($T_g$), e.g. above 45° C., e.g. above 50° C., e.g. above 70° C., e.g. above 100° C. When injection moulding a metallic material or a metal-based composite material, the elevated temperature may be a temperature of at least 100° C., e.g. as typically used in Metal Injection Moulding (MIM) techniques. When moulding or casting a metallic material or a metal-based composite material, the elevated temperature may be below the material's melting point but still above ambient temperature such that the cylindrical sleeve undergoes further cooling after the bearing has been inserted, for example a temperature of at least 500° C., or at least 400° C., or at least 300° C., or at least 200° C.

In some examples, the method further comprises cooling the cylindrical sleeve, after the bearing has been inserted, to a cooled temperature (e.g. below the material's glass transition temperature, e.g. to ambient temperature) e.g. below 50° C. e.g. below 30° C., e.g. substantially room temperature. In some examples, the inner surface contracts around the bearing to provide a cylindrical cavity comprising a second diameter, wherein the second diameter is smaller than the first diameter.

In some examples, the second diameter of the cylindrical cavity is between 40 mm and 100 mm, e.g. between 45 mm and 95 mm, e.g. between 50 mm and 80 mm, e.g. between 55 mm and 75 mm, e.g. between 60 mm and 70 mm.

In some examples, the contraction of the material of the cylindrical sleeve upon cooling results in a press fit engagement between the outer race of the bearing and the inner surface such that the bearing is held within the cylindrical cavity via friction.

The equal or greater effective diameter of the outer race (e.g. including the protrusion(s) height) relative to the inner surface of the cylindrical cavity results in contact pressure at the interface between the protrusions and the inner surface (e.g. comprising indentations) of the cylindrical sleeve in the contracted state, such that the contact pressure holds the bearing and cylindrical sleeve together (e.g. via friction) and they are substantially immovable with respect to each other. The bearing is thus held within the cylindrical cavity due to frictional engagement between the protrusion(s) and the inner surface of the cylindrical sleeve.

In some examples wherein the outer race comprises protrusion(s), the contraction of the cylindrical sleeve form(s) (an) indentation(s) (e.g. corresponding to the shape of (a) protrusion(s) on the surface of the outer race as described above) on the inner surface of the cylindrical sleeve as the inner surface contracts and moulds itself around the outer race comprising the protrusion(s). The engagement between the protrusion(s) and the indentation(s) may thus comprise both a lock and key fit and a press fit. In such examples, the bearing is held by the press fit engagement between the (e.g. at least one side of the) protrusion(s) of the outer race and the (e.g. at least one side of the) indentation(s) on the inner surface of the cylindrical sleeve, as well as being constrained from radial movement (e.g. around the sheave axis) due to engagement between the protrusion(s) and the indentation(s).

The protrusions(s) may be considered to comprise a first cross-sectional shape in the plane perpendicular to the sheave axis. It will be appreciated that the first cross-sectional shape may be any suitable and/or desirable shape wherein the curved surface of the outer race forms one side (e.g. the base) of the shape. In some examples, the first cross-sectional shape may be a semi-circle, dome, or curved outline. In some examples, the first cross-sectional shape may be substantially a square, a rectangle, a trapezoid, a triangle, truncated parabola or truncated hyperbola. For example, if the first cross-sectional shape is substantially a square the protrusion may have three straight sides related to each other by two 90° angles, wherein the fourth side (e.g. formed by the outer race) is curved (e.g. concaved into the protrusion). In some examples, the first cross-sectional shape may further include curved, fileted, rounded or chamfered corners. In some examples, the first cross-sectional shape is a four-sided polygon, e.g. a square or rectangle with four internal angles greater than 90° and two internal angles equal to or less than 90° (e.g. preferably wherein the two angles that are equal to or less than 90° are at the base of the cross-section adjacent to the groove surface), e.g. a trapezoid.

It will be appreciated that the protrusion(s) may be three-dimensional and thus comprise a length parallel to the sheave axis. For example, the first cross-sectional shape may be extended along the outer race surface in a direction parallel to the sheave axis to provide a protrusion having a given length. In some examples, the protrusion(s) has/have a length that is substantially equal to the width of the outer race (e.g. the dimension of the outer race parallel to the sheave axis). In some examples, the protrusion(s) has/have a length that is less than the width of the outer race.

In some examples, the first cross-sectional shape is constant along the length of the protrusion. For example the three-dimensional shape of the protrusion(s) is a prism, e.g. a polygon-based prism wherein the polygon base comprises the first cross-sectional shape. In some examples, the first cross-sectional shape may vary along the length of the protrusion. For example, the three-dimensional shape of the protrusion may comprise a gradient (e.g. a sloped transition) from the surface of the outer race to the maximum height of the protrusion.

In some examples, the protrusion(s) may comprise a second cross-sectional shape parallel to the length of the protrusion(s) wherein the second cross-sectional shape is any suitable and/or desirable shape. For example, the second cross-sectional shape may be a square, a rectangle, a trapezoid, a triangle, truncated parabola or truncated hyperbola. In some examples, the second cross-sectional shape may further include curved, fileted, rounded or chamfered corners. In some examples, the second cross-sectional shape is a polygonal shape, preferably flattened or rounded at the top (e.g. to create a gradual transition from the surface of the outer race to the top of the protrusion). In some examples, the second cross-sectional shape is a four-sided polygon, e.g. a square or rectangle with four internal angles greater than 90° and two internal angles equal to or less than 900 (e.g. preferably wherein the two angles that are equal to or less than 90° are at the base of the cross-section adjacent to the groove surface), e.g. a trapezoid.

In some examples, the outer race comprises a plurality of protrusions. In some examples, the plurality of protrusions are arranged to provide a cogged surface on the outer race (e.g. a cross-section of the bearing in the plane perpendicular to the sheave axis provides a cog-wheel shape).

In some examples, each protrusion of the plurality of protrusions is located at a different radial position along the outer race. For example, a plurality of protrusions, each having a width substantially equal to the width of the outer race, may be arranged around the outer race such that each of the protrusions is at a different radial position around the outer race. In some examples, the plurality of protrusions are evenly distributed around the outer race.

In some examples, the plurality of protrusions may be separated by a space between the protrusions, e.g. between a pair of protrusions there is a portion (e.g. space) of the curved outer race surface which does not comprise a protrusion. In some examples, the plurality of protrusions are substantially touching, e.g. the space between protrusions is substantially zero, e.g. the protrusions substantially entirely cover the outer race surface.

The following are examples that will be appreciated to be examples common to both the third and fourth aspects of the present disclosure.

In some examples, the mould comprises an outer casting component, wherein the outer casting component comprises the negative mould of the shape of the outer surface of the cylindrical sleeve; and an inner casting component provided within the outer casting component, wherein the inner casting component comprises the negative mould of the shape of the inner surface of the cylindrical sleeve. In preferred examples, at least part of the inner casting component and at least part of the outer casting component are not in direct contact such that a cavity is formed therebetween and upon injection, the material fills the cavity.

In some examples, the method further comprises cooling the cylindrical sleeve to a temperature below the melting temperature of the material (e.g. such that the material transitions from a liquid to substantially a solid or crystalline form) within the mould before removing the outer and/or inner casting components. For example, the cylindrical sleeve may be cooled to a temperature below the melting temperature (Tm) of the material such that the cylindrical sleeve substantially maintains the shape of the mould when the casting components are removed. For a cylindrical sleeve made from a polymeric or polymer-based composite material, preferably the temperature to which the cylindrical sleeve is cooled (e.g. within the mould) is a temperature above the glass transition temperature (Tg) such that the cylindrical sleeve absent the mould is still deformable and/or malleable, e.g. upon coming into contact with the outer race of the bearing. For a cylindrical sleeve made from a metallic material, preferably the temperature to which the cylindrical sleeve is cooled (e.g. within the mould) is a temperature relatively close to the melting point such that the cylindrical sleeve absent the mould is still deformable and/or malleable, e.g. upon coming into contact with the outer race of the bearing.

In some examples the bearing is inserted into the cylindrical cavity after the inner surface of the cylindrical sleeve has been exposed (e.g. after the removal of the inner casting component), but before the outer surface of the cylindrical sleeve has been exposed (e.g. before the outer casting component has been removed such that the outer surface remains in contact with the outer casting component of the mould).

The cylindrical sleeve may be considered to be a cylinder comprising a cylindrical bore that extends linearly from one circular face to the other circular face to provide the (e.g. substantially) cylindrical cavity extending therethrough (e.g. defined by the inner surface of the cylindrical sleeve). It will be appreciated that the cylindrical sleeve may have any suitable and/or desirable length (e.g. the distance along the sheave axis the cylindrical sleeve extends) and/or thickness (e.g. the distance extending perpendicularly from the inner surface to the outer surface).

In some examples, the groove (on the outer surface) comprises a groove surface including a width parallel to the sheave axis. In some examples, the width of the groove is between 20 and 100 mm, e.g. between 30 mm and 80 mm, e.g. between 40 mm and 70 mm, e.g. between 45 mm and 65 mm, e.g. between 50 mm and 60 mm, e.g. between 50 mm and 55 mm.

In some examples, a radial distance from the sheave axis to the groove surface varies along the width of the groove such that the groove surface has a crowned surface. It will be appreciated that a crowned surface helps to provide self-centring of the belt when the belt is received within the groove (e.g. during use within the elevator system).

In some examples, the cylindrical sleeve further comprises at least one annular rib (e.g. as described above) extending from the inner surface towards the sheave axis. The annular rib(s) may divide the inner surface of the cylindrical sleeve into a first and second (e.g. axially spaced apart) portions. The mould may be arranged to produce an annular rib having desired dimensions. In some examples, the annular rib has a width parallel to the sheave axis, wherein the width may be between 0.5 mm and 10 mm, e.g. between 1 mm and 8 mm, e.g. between 2 mm and 6 mm, e.g. between 2 mm and 5 mm, e.g. between 2 mm and 4 mm, e.g. approximately 3 mm.

In some examples, the method may comprise inserting a first bearing to be held within the cylindrical cavity of the first portion and inserting a second bearing to be held within the cylindrical cavity of the second portion.

Within the meaning of the present disclosure, the glass transition temperature (Tg) of a material is intended to define the temperature at which a polymeric material (or polymer-based composite material) transitions from a hard or brittle state to a soft or rubber state. Similarly, the melting temperature of a material is intended to define the temperature at which a material transitions from a "solid" to a liquid state. It will be appreciated that the melting temperature for a polymeric material will be at a temperature above the glass transition temperature and thus the "solid" state of the polymer before melting may be soft or deformable. The glass transition temperature and melting temperature are well known in the art and may be measured via a number of industry standard techniques as described below:

1. Differential Scanning Calorimetry (DSC) compares the amount of heat supplied to a test sample to the amount of heat supplied to a reference sample to determine the temperature at which the test sample transitions to different states (e.g. glass transition, e.g. melt transition).

2. Thermal Mechanical Analysis (TMA) is used to measure the coefficient of thermal expansion of a test sample when heated. As polymers tend to expand when heated the expansion curve may be used to calculate the coefficient of thermal expansion. For example, if a polymer passes through Tg the expansion curve changes significantly and Tg may be calculated.

3. Dynamic Mechanical Analysis (DMA) measures the response of a test sample to an oscillatory stress (or strain) and determines how that response varies with temperature, frequency or both. Tg by DMA may be reported by a. the onset of the storage modulus curve, b. the peak of the loss modulus curve and/or c. the peak of the tan delta curve.

The present disclosure as defined by any of the aspects described above and/or the appended claims thus provides a number of advantages over conventionally available (e.g. steel) sheaves. For example, this disclosure provides a sheave with mechanical properties (e.g. tensile strength) suitable for use in an elevator system at a lower cost than corresponding steel sheaves. For example, the disclosed sheaves and manufacturing methods help to minimise the number of manufacturing steps required and thus reduce the costs associated with the component manufacture, without negatively impacting the mechanical strength, durability or safety of the component when in use.

The sheaves disclosed herein are for use in a passenger conveyor system, such as an elevator system, escalator system, moving walkway or the like. The sheaves may be particularly suitable for use as a deflector sheave in an elevator system.

BRIEF DESCRIPTION OF THE DRAWINGS

Some examples of the present disclosure as defined by the appended claims are illustrated further by way of the following non-limiting examples and the accompanying figures, in which:

DETAILED DESCRIPTION

Figure 1A:
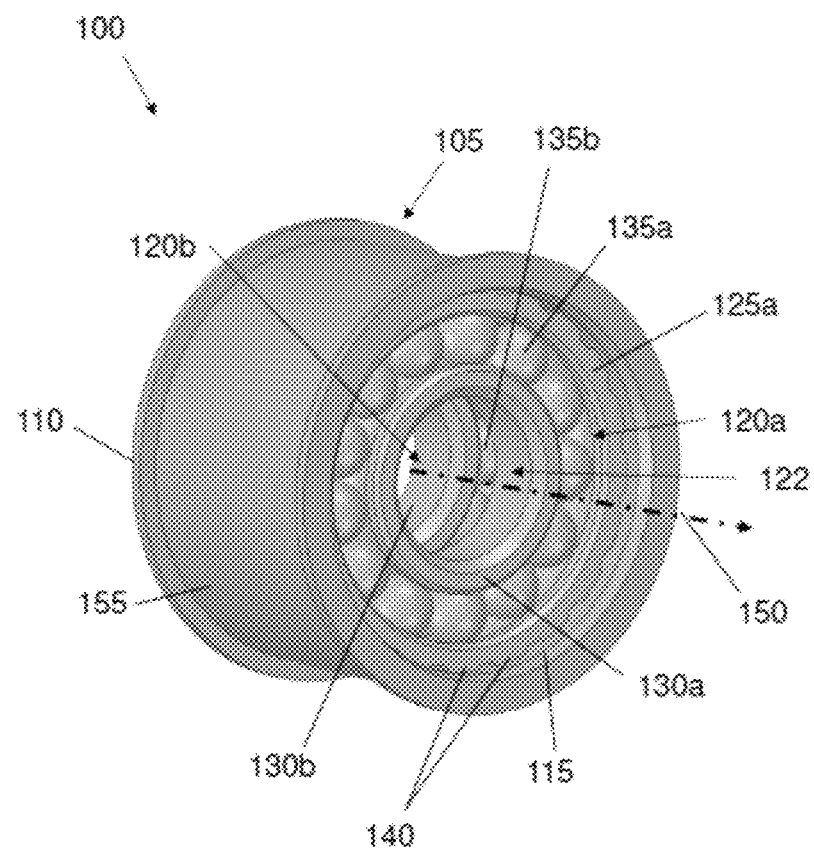
FIGS. 1A-1C shows a sheave in accordance with an example.
Figure 1B:
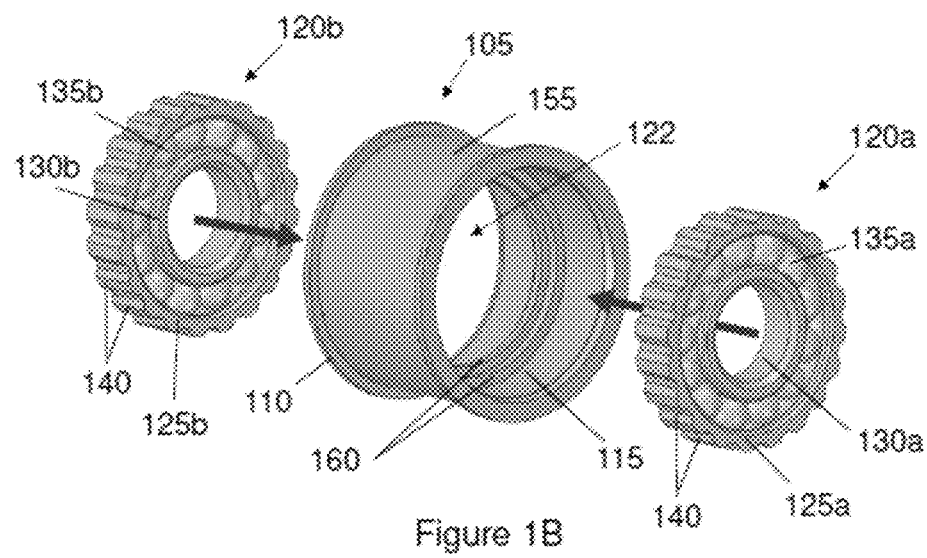
Figure 1C:
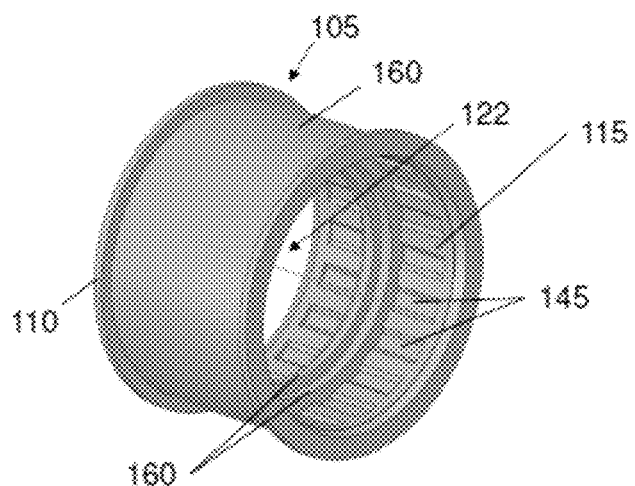

FIG. 1A shows a sheave 100 comprising a cylindrical sleeve 105 and two bearings 120a, 120b, all centred on a sheave axis 150 such that the sheave rotates about the sheave axis 150. FIG. 1B shows an exploded view of the sheave 100. The cylindrical sleeve 105 includes an outer surface 110 and an inner surface 115. The outer surface 110 includes a groove 155 which is arranged to receive a belt (not shown) in use. The inner surface 115 defines a cylindrical cavity 122 which is centred on the sheave axis 150. It can be seen that the right hand bearing 120a includes an outer race 125a, an inner race 130a and a plurality of rolling elements 135a arranged between the outer race 125a and the inner race 130a. The left hand bearing 120b has the same structure. The bearing 120a, 120b is held within the cylindrical cavity 122, against the inner surface 115 of the cylindrical sleeve 105. The outer race 125a is shown in this example to comprise a plurality of protrusions 140, distributed evenly around the outer race 125a and having a substantially trapezoidal first cross-sectional shape. FIG. 1C shows a perspective view of the cylindrical sleeve 105. It can be seen that the inner surface 115 of the cylindrical sleeve 105 comprises indentations 145 arranged to engage with the protrusions 140. In this example, the indentations 145 have a shape corresponding to a negative shape of the protrusions 140.

Figure 2A:
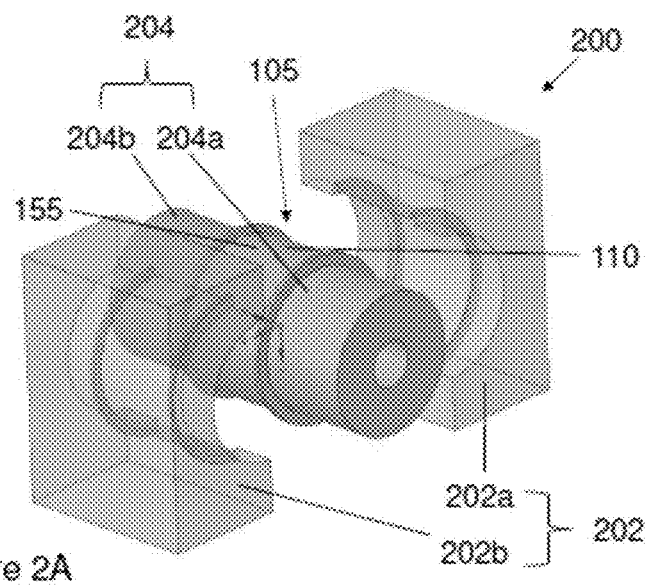
FIG. 2A shows a disc gate injection mould used to make a cylindrical sleeve in accordance with an example.

FIG. 2A shows an example of a disc gate injection mould 200 used to make a cylindrical sleeve 105. The mould 200 comprises an outer casting component 202 and an inner casting component 204. The outer casting component 202 includes the negative impression of the outer surface 110 of the cylindrical sleeve 105 such that when material (e.g. a polymeric material or a polymer-based composite material) is introduced into the outer casting component 202, the outer surface 110 of the cylindrical sleeve 105, including the groove 155, is formed.

As shown in FIG. 2A, the outer casting component 202 may be made of multiple segments 202a, 202b which fit together to provide the mould for the outer surface 110. Preferably, when fitted together, the outer casting component segments 202a, 202b provide a continuous surface such that there is substantially no meld line on the outer surface 110 of the cylindrical sleeve 105 after moulding has occurred by the disc gate injection of molten material. It will be appreciated that the outer casting component 202 may be formed of any desired number of segments, e.g. one, two, three, four and so on. The number of segments may be selected based on economic principles (e.g. cost effectiveness of producing the mould and/or using the mould) as well as practicality (e.g. such as the ease of removing the cylindrical sleeve 105 from the mould 200).

Figure 2B:
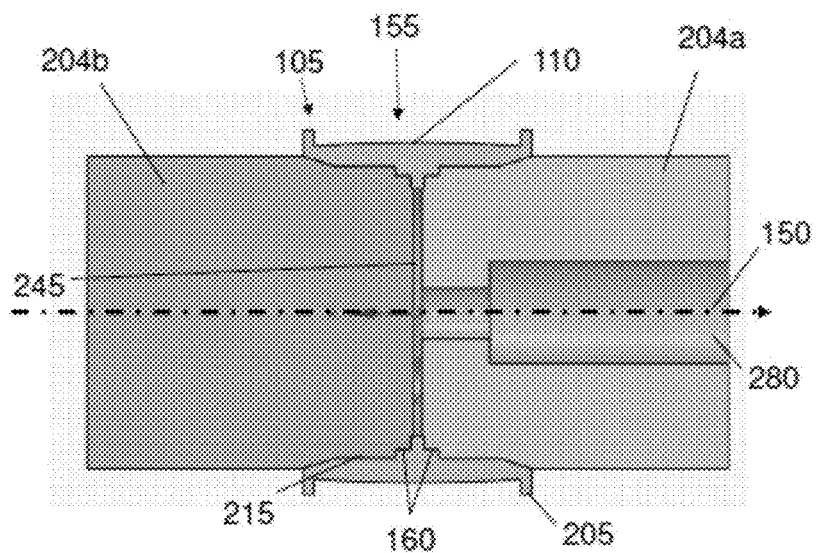
FIG. 2B shows a cross-sectional view of FIG. 2A in the plane parallel to the sheave axis after removal of the outer casting component.

FIG. 2B shows the cross-section of the inner casting component 204 shown in FIG. 2A in a plane parallel to the sheave axis 150, after removal of the outer casting component 202 to leave the exposed outer surface 110 of the moulded cylindrical sleeve 105.

As shown in FIG. 2A, the inner casting component 204 is provided within the outer casting component 202 such that the inner casting component 204 and the outer casting component 202 form a mould cavity that, when filled with the injected material, produces the shape of the cylindrical sleeve 105. The inner casting component 202 thus provides the negative mould of the shape of the inner surface 215 of the cylindrical sleeve 105. As shown in FIG. 2B, the inner surface 215 in the example shown includes two annular rib(s) 160 and thus the inner casting components 204a and 204b include the negative imprint of said annular rib(s) 160 such that they are formed on moulding. The inner casting component 204 is preferably made from at least two segments 204a, 204b separated by a disc gate 245 which is used to inject the material into the mould cavity.

The mould 200 shown in FIGS. 2A and 2B thus allows the cylindrical sleeve 105 to be manufactured as a unitary (e.g. single) piece from material (e.g. polymeric material) injected therein via a disc gate injection system 280. For example, polymeric material may be heated and then injected, through disc gate injection system 280 into the disc gate 245 which provides the polymeric material to the mould 200 such that material is provided evenly to all radial positions of the mould cavity.

The inventors have found that, through use of a disc gate 245, a cylindrical sleeve 105 may be produced that has improved physical properties (e.g. tensile strength, surface roughness, durability) which make the cylindrical sleeve 105 suitable for use in a sheave 100 for an elevator system or other passenger conveyor system.

Figure 3A:
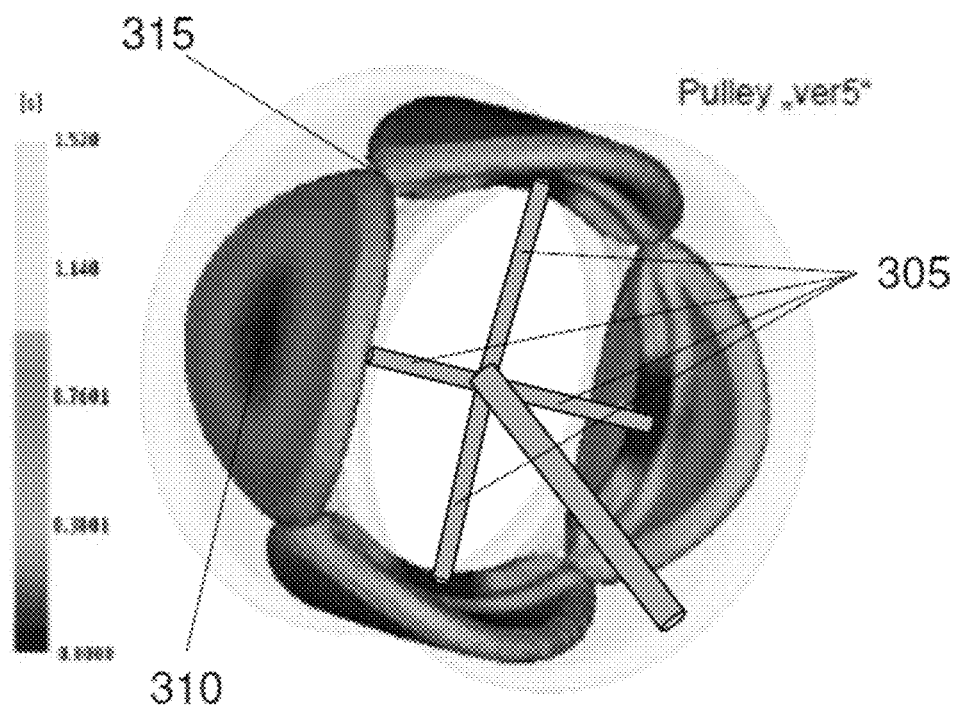
FIG. 3A shows an example of manufacturing a cylindrical sleeve via an injection moulding process using a gate that comprises four runners.

FIG. 3A shows an example of manufacturing a cylindrical sleeve via an injection moulding process that uses a four point injection gate comprising four runners 305 that input the material into the mould at four radial positions. As can be seen from FIG. 3A, injection of the material in this manner results in the spreading of material radially around the mould (for example the mould 200 shown in FIG. 2A) from four epicentres 310 corresponding to the four injection site positions. This results in a knit, or meld, line 315 where the front of material radiating outwards from different epicentres 310 meet. As seen in FIG. 3A, the fibres are randomly oriented (as represented by the darkest colour) only at the epicentres 310. As uniformity of the material at the meld line (e.g. the orientation of (e.g. glass, e.g. carbon) fibres) may be disrupted, this may result in unfavourable physical properties in the moulded component at the site of the meld, e.g. unfavourable surface defects or reduced tensile strength leading to breakage at lower loads.

Figure 3B:
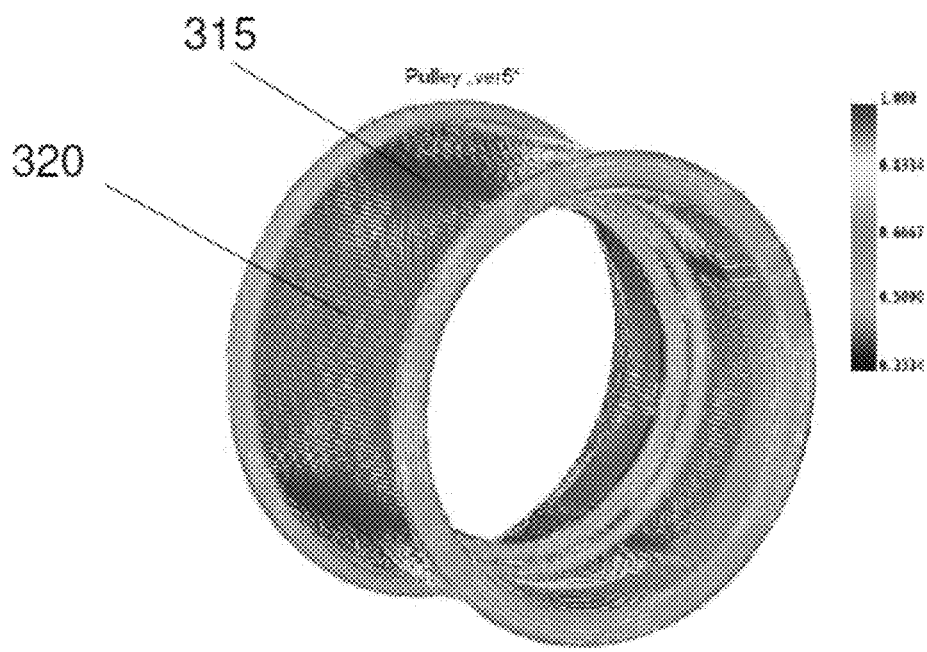
FIG. 3B shows the fibre orientation resulting in the cylindrical sleeve manufactured as shown in FIG. 3A.

FIG. 3B shows the resultant fibre orientation when a long (e.g. glass, e.g. carbon) fibre reinforced polymer is injected into the mould 200 (shown in FIG. 2A) via the four site injection gate shown in FIG. 3A. The results clearly show that at positions 320 corresponding to the epicentres 310 the fibre orientation is substantially uniform with a value of between 0.5 and 0.7. In contrast, at the meld line 315 the fibre orientation reaches the undesirable value of 1.0, representing a directional alignment.

In contrast, the inventors have found these unfavourable characteristics are improved by use of disc gate injection as shown in FIG. 2B.

In addition to the improvements described above, disc gate injection moulding helps to provide the unexpected result that, when the polymeric material injected via the disc gate comprises long (e.g. glass, e.g. carbon) fibres, the long (e.g. glass, e.g. carbon) fibres exhibit unique and advantageous alignment properties in the cylindrical sleeve.

Figure 4:
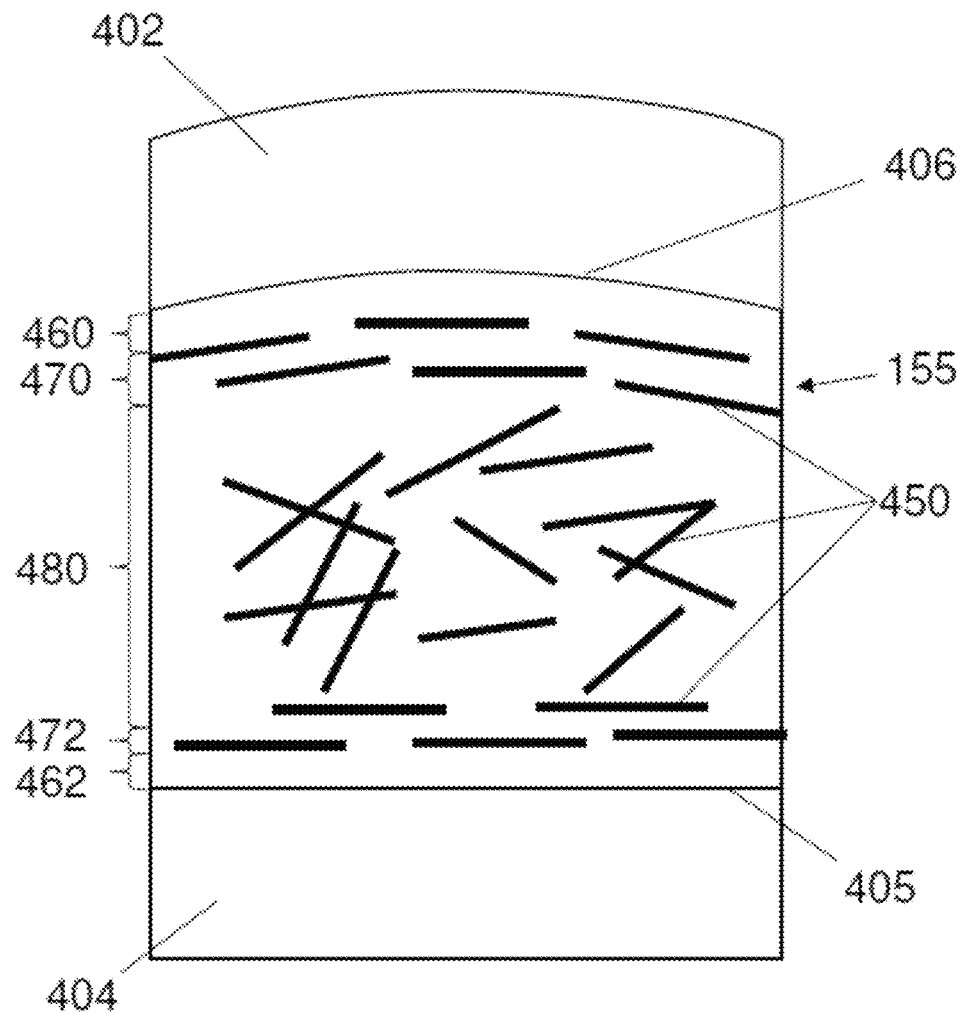
FIG. 4 shows a cross-sectional view of the sheave groove of FIG. 1 in a plane parallel to the width of the groove.

FIG. 4 shows a cross-sectional view of the groove 155 in a plane parallel to the width of the groove. As shown in FIG. 4, the groove 155 is formed between the outer casting component 402 and the inner casting component 404 of a mould where, in the example shown, the outer casting component 402 provides for a crowned (e.g. curved) surface 406 across the width of the groove 155.

As shown in FIG. 4, across the thickness of the groove (e.g. in the direction extending from the inner surface 405 of the cylindrical sleeve to the groove surface 406) there are several zones or regions of (e.g. glass, e.g. carbon) fibre alignment. In particular, FIG. 4 shows that the cylindrical sleeve (represented by the groove 155) includes a first surface layer 460 proximate to the outer surface 406 formed by the outer casting component 402, a second surface layer 462 proximate to the inner surface 405 formed by the inner casting component 404 and a core region, wherein the core region comprises an outer portion 470 proximate to the first surface layer 460, an inner portion 472 proximate to the second surface layer 462 and a central portion 480 sandwiched between the outer portion 470 and inner portion 472. The first surface layer 460, second surface layer 462, outer portion 470, inner portion 472 and the central portion 480, as shown in FIG. 4, all exhibit different (e.g. glass, e.g. carbon) fibre polymer characteristics and properties.

The first and second surface layers 460, 462 comprise a low (e.g. glass, e.g. carbon) fibre content, such that the outer surface 406 and inner surface 405 of the cylindrical sleeve are polymer-rich with substantially no (e.g. glass, e.g. carbon) fibre content by weight. This helps to provide the advantage that the generation of electrostatic charges on the surface of the belt and/or sheave (which may contribute to degradation or wear of the belt if present) is minimised without the need of costly or time consuming post production steps (such as polishing). Another advantage of the absence of fibre reinforcement in the surface layers 460, 462 is that the outer surface 406 and inner surface 405 can be smooth (e.g. glossy) without any fibres interrupting the smooth surface finish. This can be desirable for belt traction.

The outer and inner portions 470, 472 in comparison to the first and second surface layers 460, 462 comprise a high percentage by weight of (e.g. glass, e.g. carbon) fibres. Furthermore, the long (e.g. glass, e.g. carbon) fibres present in the outer and inner portions 470, 472 are highly oriented in parallel with the outer surface 406 and inner surface 405. This high degree of orientation has been shown to improve the physical properties, such as the strength and load capacity, of the sheave such that the sheave, comprising the polymeric cylindrical sleeve, is suitable for use within an elevator system.

The central portion 480, sandwiched between the outer and inner portions 470, 472, includes (e.g. glass, e.g. carbon) fibres that are predominantly randomly orientated and, in combination with the outer and inner portions 470, 472 contribute to the overall physical and mechanical properties of the cylindrical sleeve such that the sheave is able to withstand the high loads required for use within elevator systems whilst improving resistance to stress fractures or breakage.

Figure 5:
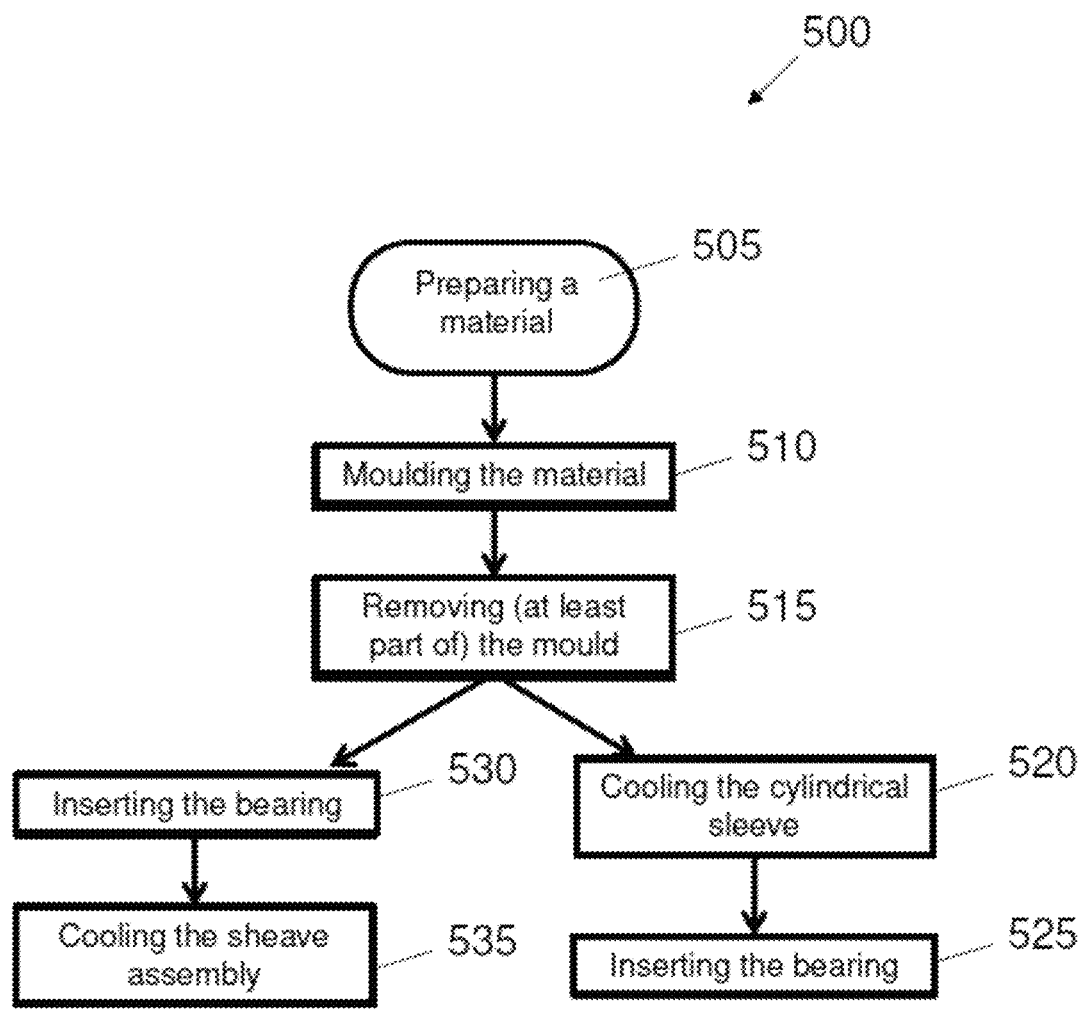
FIG. 5 shows some exemplary methods of manufacturing a sheave.

FIG. 5 shows some exemplary methods 500 of manufacturing a sheave which will be discussed with reference to FIGS. 1A-1C, FIGS. 6A-6C and FIGS. 7A-7C. The material used to make the cylindrical sleeve of the sheave can be a metallic material, metal-based composite material, polymeric material, or polymer-based composite material.

The method 500 first requires the material to be prepared at step 505 for moulding. The preparing step 505 for a polymeric material or polymer-based composite material includes heating the material to a temperature above the melting point of the polymer. For a polymer-based composite material, the preparing step 505 optionally includes adding a fibre reinforcement in advance of the moulding step 510. Once heated, the material is introduced (e.g. injected) at step 510 into the mould 200 (arranged to produce the cylindrical sleeve 105 described herein) via a disc gate 245 as seen in FIG. 2B or via another suitable moulding process. For a polymer-based composite material, the moulding step 510 optionally includes adding a fibre reinforcement. Once the material has been injected within the mould, the material is allowed to partially cool to a temperature below the material's melting temperature before removing at least the inner casting component 204 at step 515. By allowing the material to partially cool, it is ensured that the material substantially retains the shape of the mould cavity to provide the desired shape of the cylindrical sleeve 105. Step 515 relates to this partial cooling which makes it possible to remove at least part of the mould.

After the inner casting component 204 has been removed at step 515, the cylindrical sleeve may be allowed to cool (or actively cooled) at step 520 before the bearing(s) 120a, 120*b*, 820*a*, 820*b* are inserted into the cylindrical cavity 122 at step 525. In such embodiments, the outer race 125*a*, 125*b* of the bearings 120*a*, 120*b*, 820*a*, 820*b* comprise protrusions 140, 840*a*, 840*b* as shown in FIGS. 6A, 7B, 7C, 8A and 8B, such that when the bearing is inserted (e.g. upon the application of pressure) the protrusions form a press fit engagement between the outer race 125*a*, 125*b*, 225, 325 of the bearings 120*a*, 120*b*, 820*a*, 820*b* and the inner surface 115. The application of pressure when inserting the bearings 120*a*, 120*b*, 820*a*, 820*b* may further form indentations on the inner surface 115 (e.g. the inner surface 115 of the cylindrical sleeve plastically deforms upon the application of the pressure required to insert the bearings 120*a*, 120*b*, 820*a*, 820*b*) such that the protrusions and indentations form a lock and key fit between the protrusions 140 and the indentations 145.

Alternatively, the bearings 120*a*, 120*b*, 820*a*, 820*b*, 820*c* may be inserted into the cylindrical cavity 122 at step 530 whilst the cylindrical sleeve is at an elevated temperature, e.g. a temperature above the glass transition temperature $T_g$ for a polymeric material or a temperature slightly below the melting temperature for a metallic material. The cylindrical sleeve 105 is then allowed to finally cool at step 535 to an ambient temperature such that the inner surface 115 of the cylindrical sleeve 105 contracts in size and moulds (or deforms) around the outer race 125 of the bearing 120*a*, 120*b*, 820*a*, 820*b*, 820*c*. Thus contraction of the cylindrical sleeve 105 results in a press fit engagement between the outer race 125, 225, 325, 425 and the inner surface 115 of the cylindrical sleeve 105.

When the outer race 125*a*, 125*b*, 225, 325 comprises protrusions 140, 840*a*, 840*b* as shown in FIGS. 1B, 6B, 6C, 7A and 7B, the contraction of the cylindrical sleeve 105 on cooling (e.g. below the glass transition temperature) forms indentations 145 on the inner surface 115 of the cylindrical sleeve 105, resulting in a press fit engagement between the outer race 125*a*, 125*b*, 225, 325 of the bearings 120*a*, 120*b* and the inner surface 115 that includes a lock and key fit between the protrusions 140, 840*a*, 840*b* and the indentations 145.

During use of the sheave 100, stress relaxation of a polymeric cylindrical sleeve 105 can also result in the protrusions 140 becoming more embedded in the inner surface 115 by deepening the indentations 145. This further ensures reliable performance without rotational sliding between the bearing 120 and the cylindrical sleeve 105.

Figure 6A:
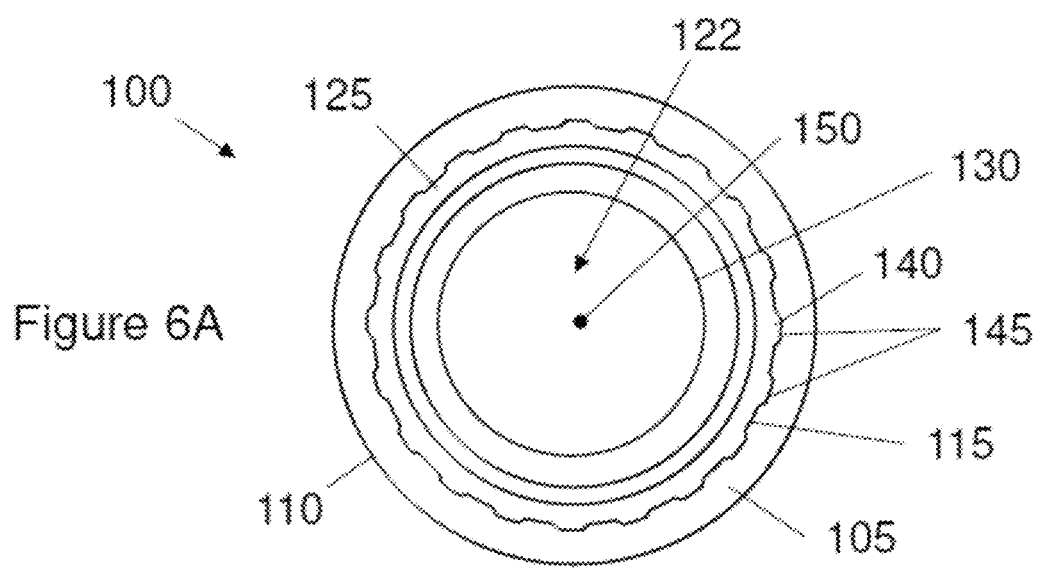
FIG. 6A shows a cross-sectional view of the sheave seen in FIG. 1 in the plane perpendicular to the sheave axis.
Figure 6B:
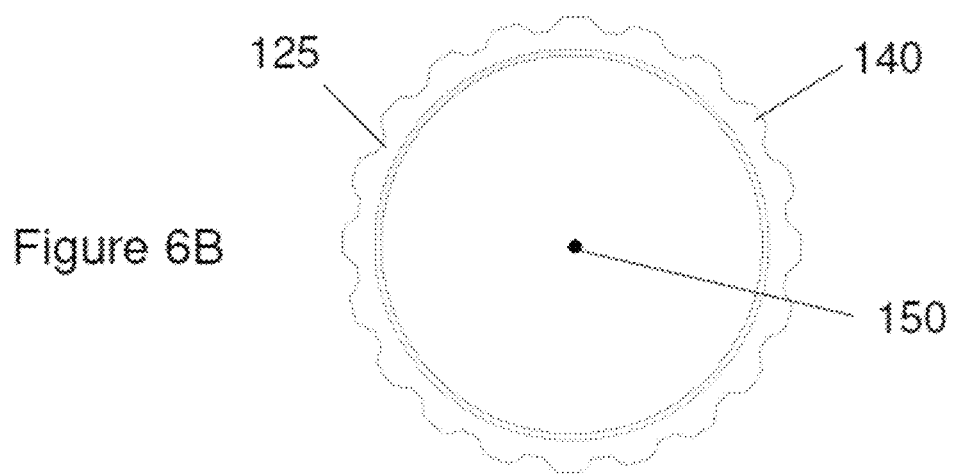
FIG. 6B shows a cross-sectional view of the outer race of the bearing from the sheave of FIG. 6A.
Figure 6C:
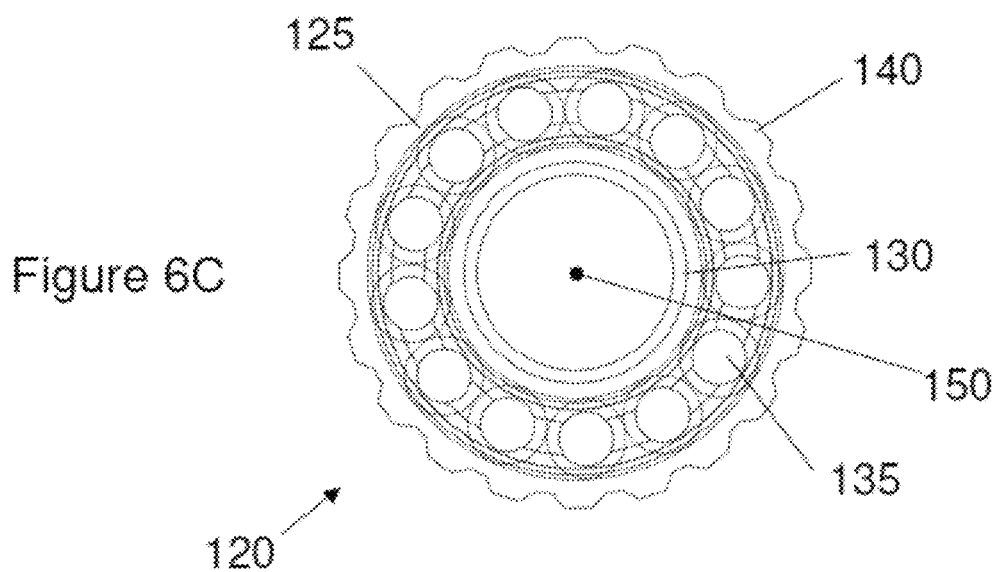
FIG. 6C shows a cross-sectional view of the bearing from the sheave of FIG. 6A.

FIGS. 6A, 6B and 6C show cross-sectional views of the sheave 100 (shown in FIG. 1), a bearing outer race 125, and a bearing 120, respectively, in the plane perpendicular to the sheave axis 150.

Figure 7A:
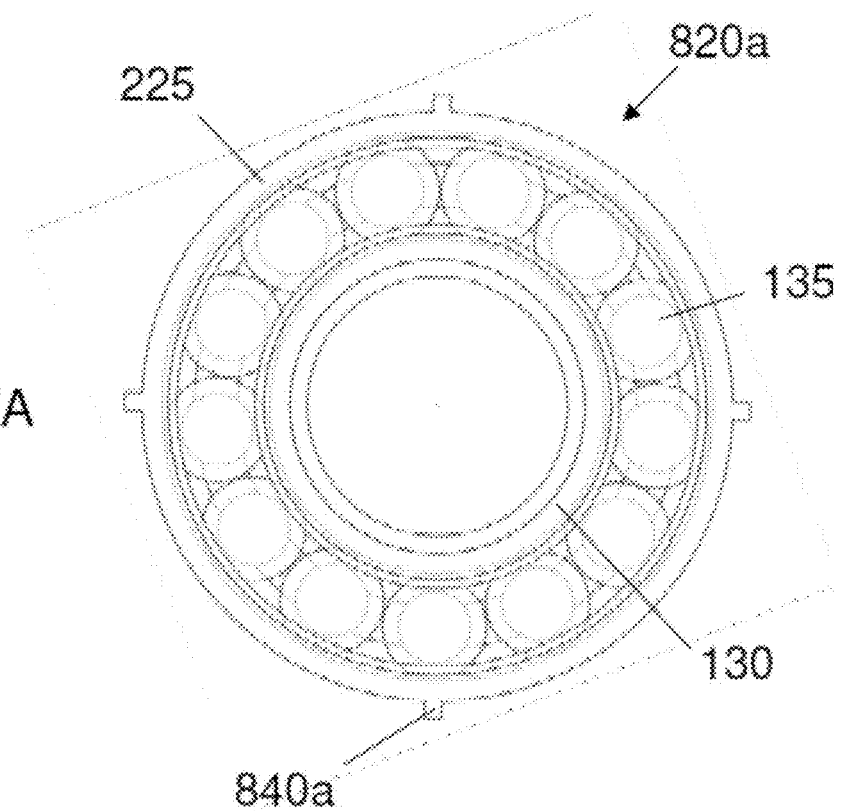
FIG. 7A shows a cross-sectional view of a bearing in accordance with a second example in the plane perpendicular to the sheave axis.

The cylindrical sleeve 115 comprises an outer surface 110 and an inner surface 115, wherein the inner surface 115 is adjacent to the bearing 120. The bearing 120 comprises an outer race 125, an inner race 130 and a plurality of ball bearings 135 (or other rolling bearings) disposed therebetween. The outer race 125 includes a plurality of protrusions 140 having a substantially trapezoidal first cross-sectional shape such that the outer race 125 has a cogged surface shape. As shown in FIG. 7A, the protrusions 140 are received within indentations 145 having a corresponding shape such that the protrusions 140 engage the indentations 145 to provide a lock and key fit, as well as a press fit between the outer race 125 and the inner surface 115 due to its smaller diameter, to hold the bearing 120 within the cylindrical cavity 122.

Figure 7B:
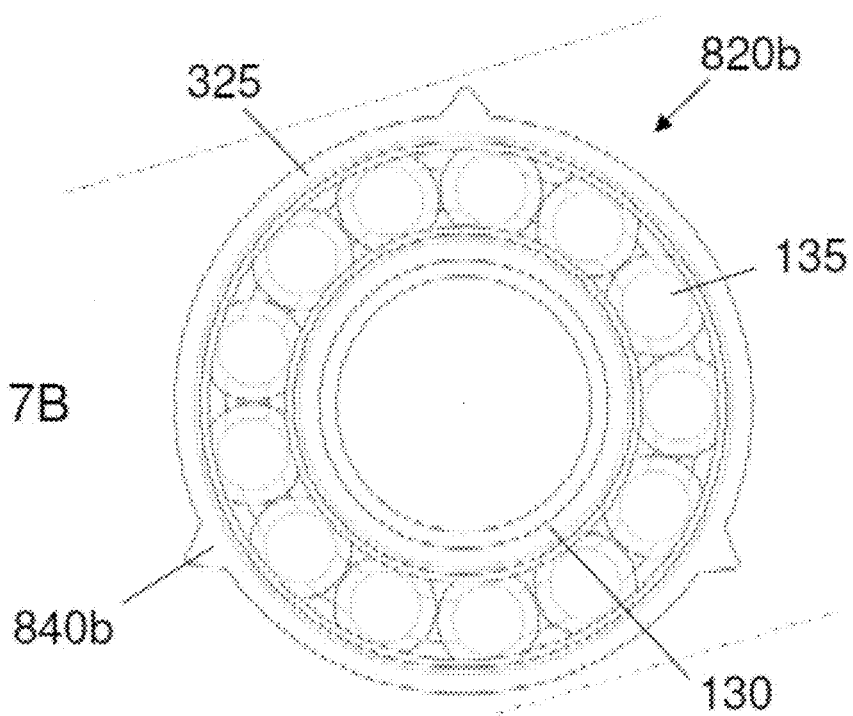
FIG. 7B shows a cross-sectional view of another bearing in accordance with a third example in the plane perpendicular to the sheave axis.
Figure 7C:
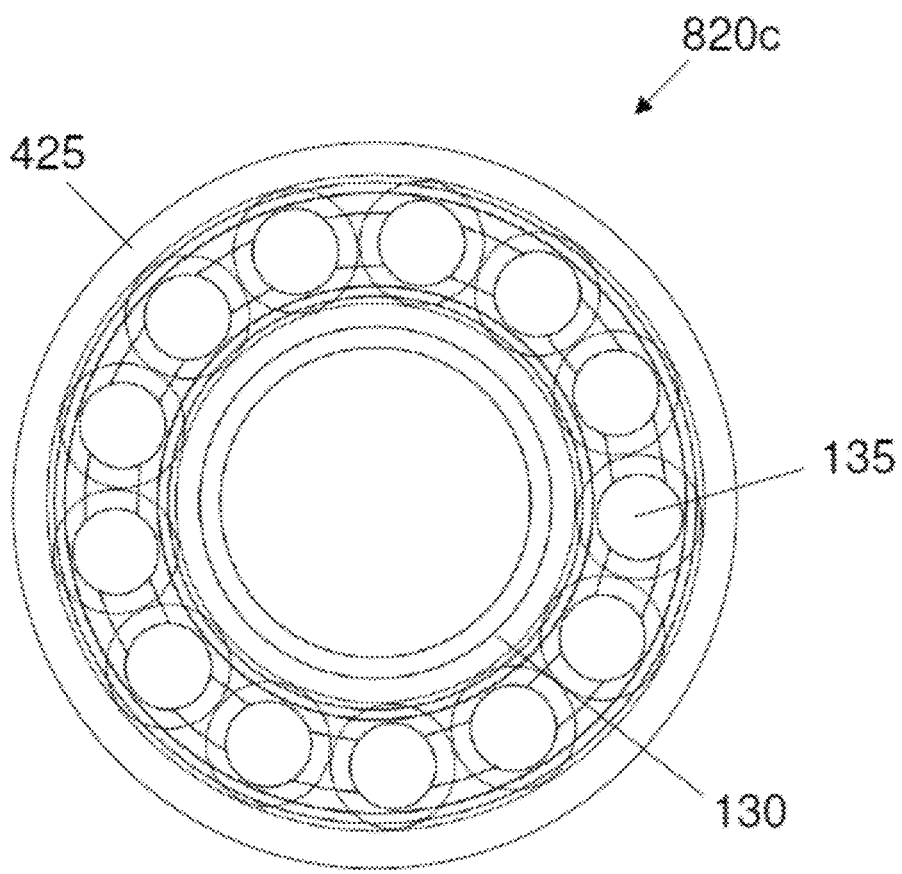
FIG. 7C shows a cross-sectional view of a bearing in accordance with a fourth example in the plane perpendicular to the sheave axis.

FIGS. 7A, 7B and 7C show cross-sectional views of three different bearing examples 820*a*, 820*b*, 820*c*. All three examples shown have an outer race 225, 325, 425, an inner race 130 and a plurality of ball bearing elements 135 disposed therebetween.

FIGS. 7A and 7B show examples wherein the outer race 225, 325 further comprises a plurality of protrusions 840*a*, 840*b*. The bearing 820*a* shown in FIG. 7A has four protrusions 840*a* arranged evenly around the outer race 225 (e.g. at 90 degrees relative to each other). The protrusions 840*a* have a substantially square first cross-sectional shape. The bearing 820*b* shown in FIG. 7B has three protrusions 840*b* arranged evenly around the outer race 325 (e.g. at 120 degrees relative to each other). The protrusions 840*b* have a substantially triangle first cross-sectional shape with a curved or rounded top corner (e.g. the corner pointing away from the sheave axis). It will be appreciated that by rounding the edges of the protrusions 840*b*, the concentration of stress will be minimised when the bearing engages the inner surface. Additionally, the rounded edge increases the surface area of the protrusion which in turn will increase the area over which friction arises between the outer race 325 and the inner surface 115 of the cylindrical sleeve 105 (e.g. as seen in FIG. 1B). FIG. 7C shows a bearing 820*c* wherein the outer race 425 is plain (e.g. flat) and does not comprise any protrusions.

Figure 8:
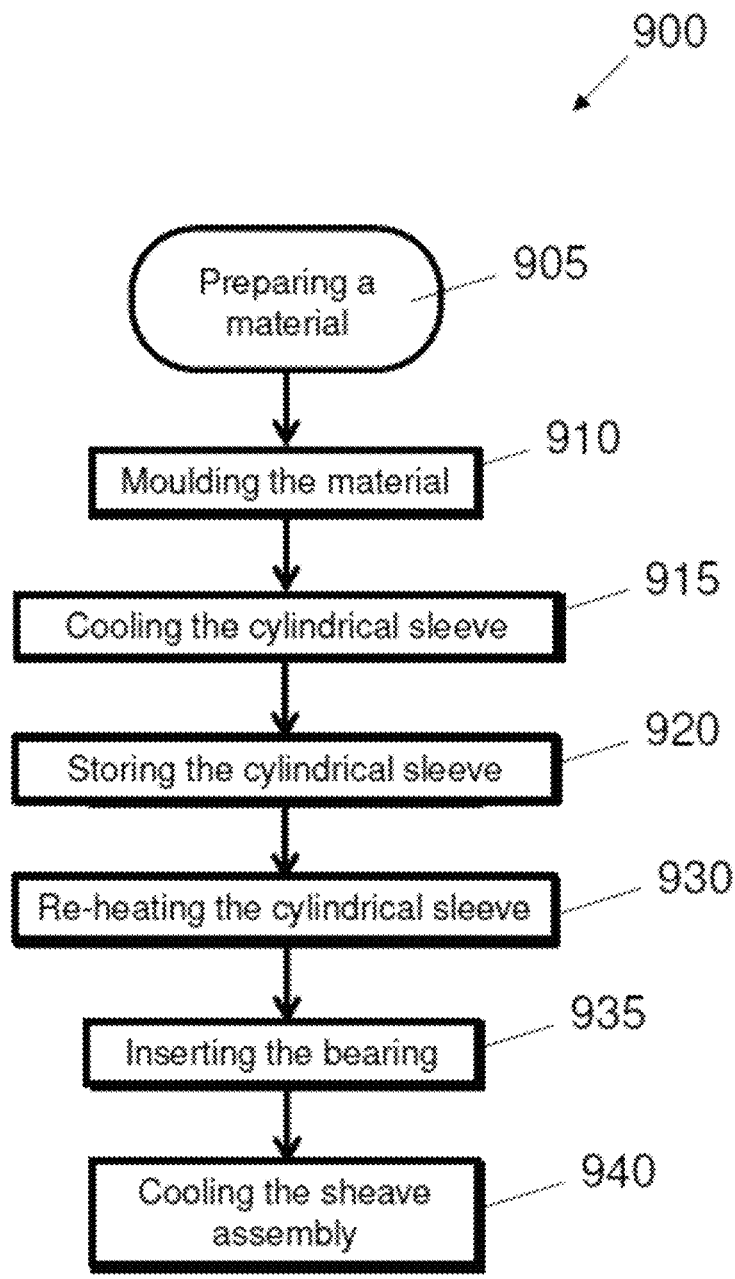
FIG. 8 shows a method of manufacturing a sheave in accordance with another example.

FIG. 8 shows another method 900 of manufacturing a sheave which will be discussed with reference to all preceding figures.

The method 900 first requires a material to be prepared for the moulding process at step 905, including heating the material to a temperature above the (matrix) material's melting point. Once heated, the material is introduced (e.g. injected) at step 910 into the mould 200 (arranged to provide the cylindrical sleeve 105 described herein). Once the material has been injected within the mould, the material is allowed to cool at step 915, at least to a temperature below the material's melting temperature, but preferably to room temperature, before removing the mould. The sleeve may then be stored at step 920.

The cylindrical sleeve 105 may then optionally be reheated at step 930 to provide the cylindrical sleeve at an elevated temperature (e.g. a temperature above the glass transition temperature $T_g$ for a polymeric material). The bearings 120*a*, 120*b*, 820*a*, 820*b*, 820*c* are inserted at step 935 into the cylindrical cavity 122 whilst the cylindrical sleeve 105 is at an elevated temperature, e.g. a temperature above the glass transition temperature $T_g$ for a polymeric material. The cylindrical sleeve 105 is then allowed to cool at step 940 (e.g. to ambient temperature, e.g. to a temperature below the glass transition temperature $T_g$) such that the inner surface 115 of the cylindrical sleeve 105 contracts in size and moulds (or deforms) around the outer race 125 of the bearing 120*a*, 120*b*, 820*a*, 820*b*, 820*c*.

The contraction of the cylindrical sleeve 105 on cooling forms a press fit between the outer race 125, 225, 325, 425 of the bearings 120*a*, 120*b*, 820*a*, 820*b*, 820*c* and the inner surface 115 of the cylindrical sleeve 105. This may form indentation(s) 145 on the inner surface 115 of the cylindrical sleeve 105 which correspond to the shape of any protrusions 140, 840*a*, 840*b*, present on the outer race 125 such that the press fit engagement includes a lock and key fit between the protrusions 140, 840*a*, 840*b* on the outer race and the corresponding indentations 145 on the inner surface 115 of the cylindrical sleeve. However, it will be appreciated that this method 900 may also be used to insert a bearing absent any protrusions.

If the outer race 425 does not comprise protrusions such that the outer race has a regular cylindrical surface (as shown in FIG. 8C) the contraction may form a single annular indentation on the inner surface 115 of the cylindrical sleeve 105 which corresponds to the dimensions of the outer race 425 and forms a press fit engagement therebetween (but without the extra mating of a lock and key engagement as provided by protrusions and indentations).

What is claimed is:

1. A sheave for a passenger conveyor system, the sheave comprising:
   a sheave axis about which the sheave rotates;
   a cylindrical sleeve comprising:
   an outer surface comprising a groove arranged to receive a belt; and
   an inner surface defining a cylindrical cavity centred on the sheave axis; and
      a bearing centred on and arranged to rotate about the sheave axis, wherein the bearing includes an outer race, an inner race and one or more rolling elements therebetween;
   wherein the outer race comprises a protrusion arranged to hold the bearing within the cylindrical cavity due to engagement between the protrusion and the inner surface of the cylindrical sleeve;
   wherein the inner surface of the cylindrical sleeve comprises an indentation arranged to engage with the protrusion;
   wherein the indentation has a shape corresponding to a negative shape of the protrusion.

2. The sheave of claim 1, wherein the protrusion is arranged to form a press fit engagement with the inner surface of the cylindrical sleeve.

3. The sheave of claim 1, wherein the outer race comprises a plurality of the protrusions arranged around the outer race.

4. The sheave of claim 1, wherein the cylindrical sleeve is moulded as a single unitary piece.

5. The sheave of claim 1, wherein the cylindrical sleeve comprises a metallic material or a metal-based composite material.

6. The sheave of claim 1, wherein the cylindrical sleeve comprises a polymeric material or a polymer-based composite material.

7. A cylindrical sleeve for a sheave for a passenger conveyor system, the cylindrical sleeve comprising:
   an outer surface comprising a groove arranged to receive a belt; and
   an inner surface defining a cylindrical cavity;
   wherein the cylindrical sleeve comprises a polymeric material or a polymer-based composite material;
   wherein the cylindrical sleeve comprises:
   a core made of the polymeric material with a first weight percentage of fibre reinforcement; and
   two surface layers defining the outer surface and the inner surface, respectively, wherein the surface layers are made of the polymeric material with a second weight percentage of fibre reinforcement;
   wherein the second weight percentage of fibre reinforcement is lower than the first weight percentage of fibre reinforcement.

8. The sheave of claim 7, wherein the composite material includes between 50 wt. % and 60 wt. % glass fibre reinforcement.

9. A cylindrical sleeve for a sheave for a passenger conveyor system, the cylindrical sleeve comprising:
   an outer surface comprising a groove arranged to receive a belt; and
   an inner surface defining a cylindrical cavity;
   wherein the cylindrical sleeve comprises a polymeric material or a polymer-based composite material;
   wherein the cylindrical sleeve or its a core of the cylindrical sleeve comprises:
   an outer portion wherein the fibre reinforcement is predominantly aligned with the outer surface;
   a central portion radially inward of the outer portion wherein the fibre reinforcement is predominantly arranged randomly; and
   an inner portion radially inward of the central portion wherein the fibre reinforcement is predominantly aligned with the inner surface.

10. A method of manufacturing a sheave for a passenger conveyor system, the method comprising:
   preparing a polymeric material or a polymer-based composite material for injection moulding;
   injecting the polymeric material or a polymer-based composite material into a mould, wherein the mould is arranged to produce a cylindrical sleeve comprising the polymeric material or polymer-based composite material, the cylindrical sleeve comprising:
   an outer surface comprising a groove arranged to receive a belt; and
   an inner surface defining a cylindrical cavity centred on the sheave axis;
   removing at least part of the mould to expose the inner surface of the cylindrical sleeve; and
   inserting a bearing into the cylindrical cavity while the cylindrical sleeve is at an elevated temperature, wherein the bearing includes an outer race, an inner race and one or more rolling elements therebetween, such that subsequent cooling of the cylindrical sleeve creates an engagement between an outer surface of the outer race and the inner surface of the cylindrical sleeve.

11. The method of claim 10, wherein the outer race comprises a protrusion arranged to hold the bearing within the cylindrical cavity due to engagement between the protrusion and the inner surface of the cylindrical sleeve.

12. A method of manufacturing a sheave for a passenger conveyor system, the method comprising:
   introducing a material into a mould, wherein the mould is arranged to produce a cylindrical sleeve, the cylindrical sleeve comprising:
   an outer surface comprising a groove arranged to receive a belt; and
   an inner surface defining a cylindrical cavity centred on the sheave axis;
   removing at least part of the mould to expose the inner surface of the cylindrical sleeve; and
   inserting a bearing into the cylindrical cavity to form a sheave, wherein the bearing includes an outer race, an inner race and one or more rolling elements therebetween;
   wherein the outer race comprises a protrusion arranged to hold the bearing within the cylindrical cavity due to engagement between the protrusion and the inner surface of the cylindrical sleeve.

* * * * *